United States Patent
Cruz-Hernandez et al.

(10) Patent No.: US 9,507,421 B2
(45) Date of Patent: Nov. 29, 2016

(54) SYNCHRONIZING HAPTIC EFFECTS TO MULTIMEDIA

(71) Applicant: Immersion Corporation, San Jose, CA (US)

(72) Inventors: Juan Manuel Cruz-Hernandez, Montreal (CA); Henrique D. Da Costa, Montreal (CA); Danny A. Grant, Laval (CA); Robert A. Lacroix, Saint-Lambert (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/532,067

(22) Filed: Nov. 4, 2014

(65) Prior Publication Data

US 2015/0058722 A1    Feb. 26, 2015

Related U.S. Application Data

(60) Division of application No. 14/033,756, filed on Sep. 23, 2013, now Pat. No. 8,909,817, which is a division of application No. 13/479,969, filed on May 24, 2012, now Pat. No. 8,572,293, which is a division of application No. 12/842,626, filed on Jul. 23, 2010, now Pat. No. 8,260,972, which is a continuation of application No. 10/983,229, filed on Nov. 8, 2004, now Pat. No. 7,765,333.

(60) Provisional application No. 60/587,904, filed on Jul. 15, 2004.

(51) Int. Cl.
*G06F 3/00*    (2006.01)
*G06F 3/01*    (2006.01)
*G06F 3/0488*  (2013.01)

(52) U.S. Cl.
CPC ............ *G06F 3/016* (2013.01); *G06F 3/0488* (2013.01)

(58) Field of Classification Search
None
See application file for complete search history.

(56) References Cited

U.S. PATENT DOCUMENTS

| | | |
|---|---|---|
| 4,334,280 A | 6/1982 | McDonald |
| 4,355,348 A | 10/1982 | Williams |
| 5,388,992 A | 2/1995 | Franklin et al. |
| 5,461,711 A | 10/1995 | Wang et al. |
| 5,526,480 A | 6/1996 | Gibson |
| 5,586,257 A | 12/1996 | Perlman |

(Continued)

FOREIGN PATENT DOCUMENTS

EP    0 875 819 A1    11/1998

OTHER PUBLICATIONS

Gillespie, Brent, "The Virtual Piano Action: Design and Implementation," Center for Computer Research in Music and Acoustics, 1994, 4 pages.

(Continued)

*Primary Examiner* — David E Martinez
(74) *Attorney, Agent, or Firm* — Miles & Stockbridge P.C.

(57) ABSTRACT

A signal associated with multiple haptic effects is received, each haptic effect from the multiple haptic effects being associated with a time slot from multiple time slots. Each haptic effect from the multiple haptic effects is associated with an effect slot from multiple effect slots at least partially based on the time slot associated with that haptic effect. An output signal is sent for each effect slot from the multiple effect slots, when the associated haptic effect is scheduled for its time slot.

20 Claims, 14 Drawing Sheets

(56) References Cited

U.S. PATENT DOCUMENTS

| | | |
|---|---|---|
| 5,669,818 A | 9/1997 | Thorner et al. |
| 5,684,722 A | 11/1997 | Thorner et al. |
| 5,742,278 A | 4/1998 | Chen et al. |
| 5,816,823 A | 10/1998 | Naimark et al. |
| 5,842,162 A | 11/1998 | Fineberg |
| 5,844,392 A | 12/1998 | Peurach et al. |
| 5,884,029 A | 3/1999 | Brush, II et al. |
| 5,956,484 A | 9/1999 | Rosenberg et al. |
| 5,959,613 A | 9/1999 | Rosenberg et al. |
| 6,036,495 A | 3/2000 | Marcus et al. |
| 6,111,562 A | 8/2000 | Downs et al. |
| 6,147,674 A | 11/2000 | Rosenburg et al. |
| 6,160,489 A | 12/2000 | Perry et al. |
| 6,161,126 A | 12/2000 | Wies et al. |
| 6,252,583 B1 | 6/2001 | Braun et al. |
| 6,278,439 B1 | 8/2001 | Rosenberg et al. |
| 6,285,351 B1 | 9/2001 | Chang et al. |
| 6,292,776 B1 | 9/2001 | Chengalvarayan |
| 6,424,356 B2 | 7/2002 | Chang et al. |
| 6,703,550 B2 | 3/2004 | Chu |
| 6,710,764 B1 | 3/2004 | Burgel et al. |
| 6,859,819 B1 | 2/2005 | Rosenberg et al. |
| 6,885,876 B2 | 4/2005 | Aaltonen et al. |
| 6,963,762 B2 | 11/2005 | Kaaresoja et al. |
| 2001/0045935 A1 | 11/2001 | Chang et al. |
| 2002/0044132 A1 | 4/2002 | Fish et al. |
| 2002/0163498 A1 | 11/2002 | Chang et al. |
| 2003/0006892 A1 | 1/2003 | Church |
| 2003/0067440 A1 | 4/2003 | Rank |
| 2003/0076298 A1 | 4/2003 | Rosenberg |
| 2003/0166405 A1* | 9/2003 | Jauk et al. .................. 455/466 |
| 2004/0104924 A1 | 6/2004 | Braun et al. |
| 2005/0134561 A1 | 6/2005 | Tierling et al. |
| 2005/0156892 A1 | 7/2005 | Grant |
| 2005/0219206 A1 | 10/2005 | Schena et al. |
| 2006/0038781 A1 | 2/2006 | Levin |
| 2006/0119573 A1 | 6/2006 | Grant et al. |
| 2008/0048974 A1 | 2/2008 | Braun et al. |

OTHER PUBLICATIONS

"VibeTonz System", Immersion Corporation, 2004, pp. 1-6.
"VibeTonz Mobile Player", Immersion Corporation, 2005, 4 pages.
"VibeTonz Solution for BREW Developers", Immersion Corporation, 2005, 2 pages.
"VibeTonz Studio SDK", Immersion Corporation, 2005, 4 pages.
Kirman, Jacob H., "Tactile Perception of Computer-Derived Formant Patterns From Voiced Speech," J. Acoust. Soc. Am., vol. 55, No. 1, Jan. 1974, pp. 163-169.
Reed, Charlotte M. et al., "Research on Tactile Communication of Speech: A Review," ASHA Monographs, No. 20, 1982, pp. 1-23.
International Search Report and Written Opinion, Application No. PCT/US04/40505, date mailed Jun. 23, 2008.

* cited by examiner

| Relative memory address | | Byte0 | Byte1 | Byte2 | Byte3 | Byte4 | Byte5 | Byte6 | Byte7 |
|---|---|---|---|---|---|---|---|---|---|
| Effect0 | 0x0000 | SetPeriodic message | | | | | | | |
| Effect1 | 0x0008 | SetPeriodic message | | | | | | | |
| Effect2 | 0x0010 | SetPeriodicModifier message | | | | | | | |
| | 0x0018 | SetPeriodic message | | | | | | | |
| Effect3 | 0x0020 | SetPeriodicModifier message | | | | | | | |
| | 0x0028 | SetPeriodic message | | | | | | | |
| Effect4 | 0x0030 | SetPeriodic message | | | | | | | |
| | 0x0038 | | | | | | | | |

SYNCHRONIZING HAPTIC EFFECTS TO MULTIMEDIA

CROSS-REFERENCE TO RELATED APPLICATIONS

This application is a divisional of application Ser. No. 14/033,756 filed on Sep. 23, 2013 (herein incorporated by reference), which is a divisional of U.S. patent application Ser. No. 13/479,969 filed on May 24, 2012 (herein incorporated by reference), which is a divisional of U.S. patent application Ser. No. 12/842,626, filed on Jul. 23, 2010 (herein incorporated by reference), which is a continuation application of U.S. patent application Ser. No. 10/983,229, filed on Nov. 8, 2004 (herein incorporated by reference), which claims priority of U.S. Provisional Application No. 60/587,904 filed Jul. 15, 2004 (herein incorporated by reference).

BACKGROUND

The invention relates generally to haptic feedback devices. More specifically, the invention relates to systems and methods for ordering haptic effects.

Devices that provide tactile feedback, such as haptic feedback, have enjoyed increased popularity in recent years. These devices are used in a variety of different applications. For example, devices providing haptic feedback are popular in various computer gaming applications, where the haptic feedback enhances the overall gaming experience of a user. In addition to gaming applications, haptic feedback devices also have been used in a variety of other computer-application contexts. For example, haptic-enabled controllers, such as mouse devices, can be configured to provide haptic feedback to a user while the user interacts with an operating system (OS), or other application.

Similarly, tactile feedback has been incorporated in various virtual reality applications to enhance the overall experience of a user. For example, haptic feedback can be incorporated in a virtual environment to provide a more realistic interactive simulation experience. Surgery simulation, for example, is a virtual reality environment where haptic feedback has been used to provide a user with a more realistic experience and, hence, a more educational experience.

Tactile feedback has also been increasingly incorporated in portable electronic devices, such as cellular telephones, personal digital assistants (PDAs), portable gaming devices, and a variety of other portable electronic devices. For example, some portable gaming applications are capable of vibrating in a manner similar to control devices (e.g., joysticks, etc.) used with larger-scale gaming systems that are configured to provide haptic feedback. Additionally, devices such as cellular telephones and PDAs are capable of providing various alerts to users by way of vibrations. For example, a cellular telephone can alert a user to an incoming telephone call by vibrating. Similarly, a PDA can alert a user to a scheduled calendar item or provide a user with a reminder for a "to do" list item or calendar appointment.

Generally, vibrations output by standard portable electronic devices, such as PDAs and cellular telephones, are simple vibrations, which operate as binary vibrators that are either on or off. That is, the vibration capability of those devices is generally limited to a full-power vibration (a "fully on" state), or a rest state (a "fully off"). Thus, generally speaking, there is little variation in the magnitude of vibrations that can be provided by such devices.

Existing devices, however, are rather rudimentary and do not provide sophisticated tactile feedback. Accordingly, it would be desirable to provide more sophisticated vibrations, which can convey additional information (e.g., by way of a sophisticated series of effects), and which can provide a user with an enhanced tactile experience beyond what is possible using devices that are currently available.

SUMMARY

An embodiment of the invention provides an apparatus that includes an ordering component and an output component. The ordering component is configured to associate each basis haptic effect from multiple basis haptic effects with a time slot from multiple time slots. The output component is configured to associate each basis haptic effect from the multiple basis haptic effects with an effect slot from multiple effect slots. The output component is also configured to cause each basis haptic effect from the multiple basis haptic effects to be output during the time slot associated with that haptic effect.

Another embodiment of the invention provides a method that receives a signal associated with multiple haptic effects. Each haptic effect from the multiple haptic effects is associated with a time slot from multiple time slots. The method also associates each haptic effect from the multiple haptic effects with an effect slot from multiple effect slots at least partially based on the time slot associated with that haptic effect. The method also sends an output signal for each effect slot from the multiple effect slots, when the associated haptic effect is scheduled for its time slot. The method can be implemented by a processor device, such as a computer, using a processor-readable medium comprising computer code representing instruction configured to cause a processor to implement the method.

BRIEF DESCRIPTION OF THE DRAWINGS

FIG. 12 is block diagram of memory addresses for multiple, basis haptic effects, according to an embodiment of the invention.

DETAILED DESCRIPTION

Figure 1:
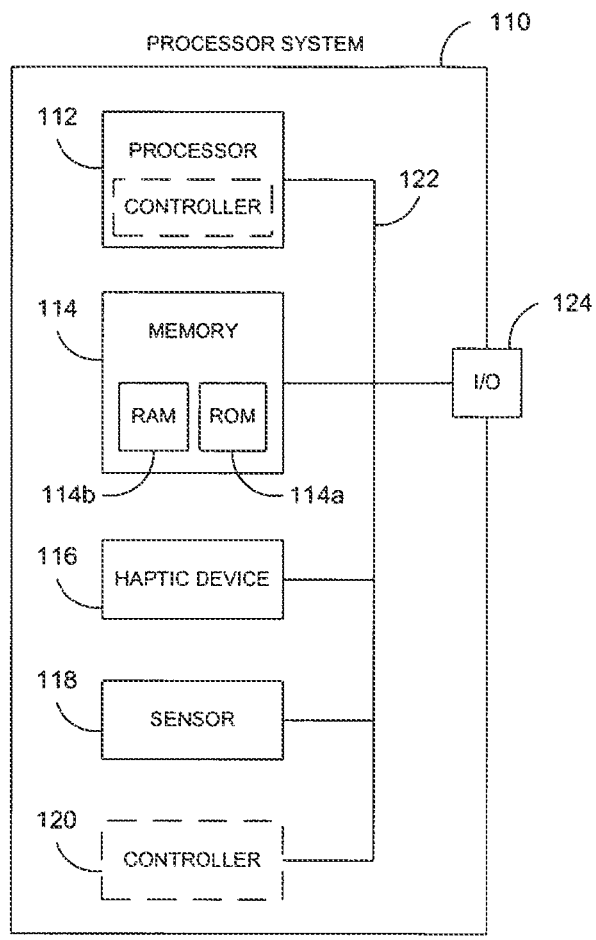
FIG. 1 is a block diagram of a processor system, according to an embodiment of the invention.

Systems and methods for ordering haptic effects are described. More specifically, an embodiment of the invention is described in the context of a system and method configured to output a series of "basis," or fundamental, haptic effects based on a time slot associated with each of the basis haptic effects. Basis haptic effects are output in response to basis haptic-effect signals. The basis haptic-effect signals are each associated with one of several effect slots based on the time slot associated with that basis haptic effect. The series of basis haptic effects output according to one or more embodiments of the invention is capable of conveying additional information to users that has not been possible using known devices. Moreover, the series of basis haptic effects output according to one or more embodiments of the invention is also capable of providing a user with an enhanced experience while using a device, such as a portable electronic device.

As used herein, the term "basis haptic effect" refers to an elemental haptic effect that can be used as a component or "building block" of more complex haptic effects. A "basis haptic-effect signal" is a signal that causes a basis haptic effect to be output (e.g., via a haptic device). Basis haptic effects are also sometimes referred to herein as "haptic effects" for the sake of simplicity.

According to one or more embodiments of the invention, basis haptic effects can include many types of effects, such as periodic haptic effects and magnitude-sweep haptic effects. These basis haptic effects can be used as components or "building blocks," for example, to form a timeline haptic effect. Each of the components of the timeline effect can be ordered in such a way to provide a specific, desired tactile output to a user. The ordering of these components (e.g., basis haptic effects) can occur, for example, based on a time slot associated therewith.

An event-driven scheme, similar to schemes used for MIDI files, or the like, can be used to output timeline haptic effects. Timeline haptic effects can be created by way of an interactive software-authoring tool, which allows a developer to specify the nature, order, and timing of basis haptic effects used to create a timeline haptic effect. Additionally, or alternatively, timeline haptic effects can be created by automatically converting information from files having an event-driven scheme (e.g., MIDI files, etc.).

According to one or more embodiments of the invention, an architecture (which can include software, firmware, hardware, or any combination thereof) is provided. The architecture can include an ordering component configured to associate each basis haptic effect from multiple basis haptic effects with a time slot during which that basis haptic effect is to be output. This can be accomplished, for example, based on one or more control signals received by the ordering component (e.g., from an interface component). The ordering component can, for example, provide an ordered haptic-effect signal (e.g., a timeline haptic-effect signal) to a driver, which is configured to cause all basis haptic effects associated with the timeline haptic-effect signal to be output via a haptic device. The output component is configured to associate each basis haptic effect with an effect slot from multiple effect slots. The output component is also configured to cause each basis haptic effect to be output during its associated time slot.

Advantageously, one or more embodiments of the invention allow haptic effects to be output based on information obtained from, converted from, or otherwise associated with a corresponding output (e.g., as defined by a MIDI file, etc.). For example, in the case of event-driven files, such as MIDI files, haptic effects can be output based on the notes, channels, or any combination thereof, defined in the MIDI file. This allows haptic effects to be output synchronously with such event-driven files (e.g., synchronized with the beat of music created by a MIDI file). Following this example, a different haptic effect can be defined for each MIDI instrument and/or channel, or combination thereof, such that a great variety of haptic effects is available (e.g., each haptic effect can correspond to one of over 200 MIDI instruments). Moreover, haptic effects can be commanded to correspond to parameters of MIDI files (e.g., corresponding to notes in length, speed, strength, duration, etc.), or can be based on such parameters, but tailored as desired, according to one or more other embodiments of the invention. Editing such parameters can be carried out prior to, during, or after selection of corresponding features in the MIDI file.

FIG. 1 is a block diagram of a processor system, according to an embodiment of the invention. The processor system 110 illustrated in FIG. 1 can be, for example, a commercially available personal computer, portable electronic device, or a less complex computing or processing device (e.g., a device that is dedicated to performing one or more specific tasks). For example, the processor system can be a cellular telephone, a PDA, a portable gaming system, or the like. Alternatively, the processor system 110 can be a terminal dedicated to providing an interactive virtual reality environment, such as a gaming system, or the like. Although each component of the processor system 110 is shown as being a single component in FIG. 1, the processor system 110 can include multiple numbers of any components illustrated in FIG. 1. Additionally, multiple components of the processor system 110 can be combined as a single component.

The processor system 110 includes a processor 112, which according to one or more embodiments of the invention, can be a commercially available microprocessor capable of performing general processing operations. Alternatively, the processor 112 can be an application-specific integrated circuit (ASIC) or a combination of ASICs, which is designed to achieve one or more specific functions, or enable one or more specific devices or applications. In yet another alternative, the processor 112 can be an analog or digital circuit, or a combination of multiple circuits.

Alternatively, the processor 112 can optionally include one or more individual sub-processors or coprocessors. For example, the processor can include a graphics coprocessor that is capable of rendering graphics, a math coprocessor that is capable of efficiently performing complex calculations, a controller that is capable of controlling one or more devices, a sensor interface that is capable of receiving sensory input from one or more sensing devices, and so forth.

The processor system 110 can also include a memory component 114. As shown in FIG. 1, the memory component 114 can include one or more types of memory. For example, the memory component 114 can include a read only memory (ROM) component 114a and a random access memory (RAM) component 114b. The memory component 114 can also include other types of memory not illustrated in FIG. 1 that are suitable for storing data in a form retrievable by the processor 112. For example, electronically programmable read only memory (EPROM), erasable electrically programmable read only memory (EEPROM), flash memory, as well as other suitable forms of memory can be included within the memory component 114. The processor system 110 can also include a variety of other components, depending upon the desired functionality of the processor system 110. The processor 112 is in communication with the memory component 114, and can store data in the memory component 114 or retrieve data previously stored in the memory component 114.

The processor system 110 can also include a haptic device 116, which is capable of providing a variety of tactile feedback. For example, the haptic device 116 can be configured to output basis haptic effects, such as periodic effects, magnitude-sweep effects, or timeline haptic effects, each of which is described in greater detail below. According to one or more embodiments of the invention, the haptic device 116 can include one or more force-applying mechanisms, which are capable of providing tactile force to a user of the processor system 110 (e.g., via the housing of the processor system 110). This force can be transmitted, for example, in the form of vibrational movement caused by the haptic device 116 (e.g., caused by a rotating mass, a piezoelectric device, or other vibrating actuator), or in the form of resistive force caused by the haptic device 116.

The processor system 110 can also, according to one or more embodiments of the invention, include a sensor 118 that is capable of receiving input from a user, the haptic device 116, or is otherwise capable of sensing one or more physical parameters. For example, according to one or more embodiments of the invention, a sensor 118 can be configured to measure speed, intensity, acceleration, or other parameters associated with a haptic effect output by the haptic device 116. Similarly, the sensor 118 can be configured to sense environmental or ambient conditions of the processor system's surroundings. The sensor 118 can interface and communicate with the processor 112 by way of a sensor interface (not shown) within the processor 112.

The processor system 110 can also include a controller 120, which can optionally be internal to the processor 112, or external thereto, as shown in FIG. 1. The controller 120 can be configured to control the haptic device 116 when the processor 112 is not directly controlling the haptic device 116. Similarly, the controller 120 can control the memory 114 and/or the sensor 118, as well as devices external to the processor system 110 by way of an input/output (I/O) component 124 (described below).

The various components of the processor system 110 can communicate with one another via a bus 122, which is capable of carrying instructions from the processor 112 and/or the controller 120 to other components, and which is capable of carrying data between the various components of the processor system 110. Additionally, signals received via the sensor 118 can be communicated to the processor 112 or the controller 120 by way of the bus 122. Data retrieved from or written to memory 114 is carried by the bus 122, as are instructions to the haptic device 116. Instructions to the haptic device 116 can be provided in the form of haptic-effect signals (e.g., basis haptic-effect signals), for example, which can be provided by the processor 112, the controller 120, or devices external to the processor system 110.

The components of the processor system 110 can communicate with devices external to the processor system 110 by way of an input/output (I/O) component 124 (accessed via the bus 122). According to one or more embodiments of the invention, the I/O component 124 can include a variety of suitable communication interfaces. For example, the I/O component 124 can include, for example, wireless connections, such as infrared ports, optical ports, Bluetooth wireless ports, wireless LAN ports, or the like. Additionally, the I/O component 124 can include, wired connections, such as standard serial ports, parallel ports, universal serial bus (USB) ports, S-video ports, large area network (LAN) ports, small computer system interface (SCSI) ports, and so forth.

Figure 2:
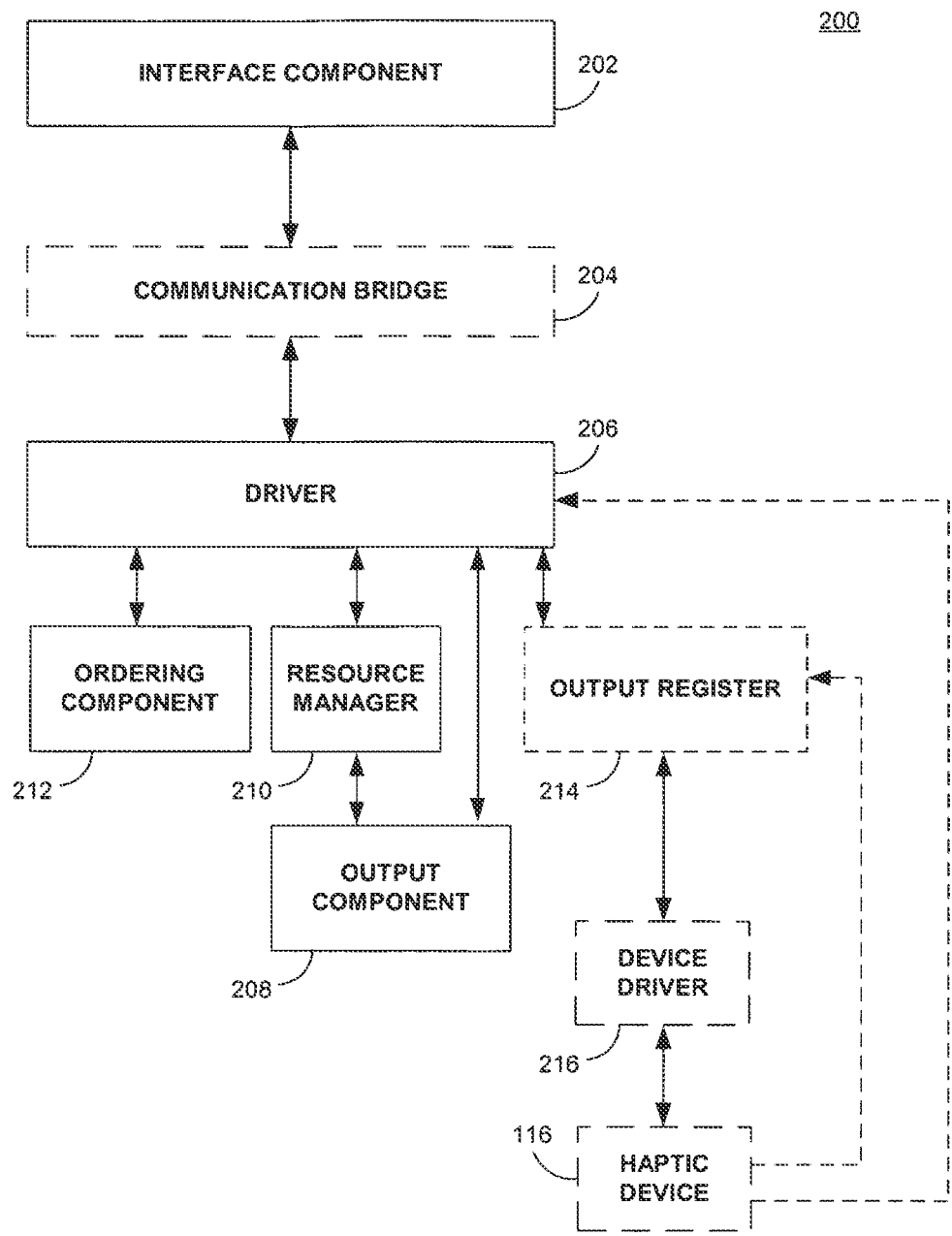
FIG. 2 is a block diagram of a system configured to order haptic effects, according to an embodiment of the invention.

FIG. 2 is a block diagram of a system configured to order haptic effects, according to an embodiment of the invention. The various components of the system 200 illustrated in FIG. 2 are configured to cause the haptic device 116 to output a series of basis haptic effects (e.g., arranged as a timeline haptic effect). According to one or more embodiments of the invention, software components of the system shown in FIG. 2 are illustrated with solid lines, while hardware components are illustrated with dashed lines. It will be appreciated, however, that at least some components of the system 200 implemented using software can be implemented using hardware of firmware. Moreover, any combination of software, hardware, and firmware can be used for any components shown in FIG. 2, depending upon the desired functionality of the system 200.

The system 200 of FIG. 2 includes an interface component 202, which can be configured to communicate with a client application external to the system 200. The interface component 202 can serve as a connection point to the system 200 for a client application external to the system 200. For example, according to one or more embodiments of the invention, the interface component 202 can include an application-programming interface (API), which is configured to provide access to the capabilities of the system 200 for an application program outside of that system 200. According to one or more embodiments of the invention, the interface component 202 can be configured to run on the same processor as an application that accesses the system 200 via the interface component 202. For example, both the interface component 202 and the accessing application program can run on a processor similar to the processor 112 of the processor system 110 described above (shown in FIG. 1). Alternatively, the interface component 202 and the application program accessing the system 200 via the interface component can run on separate, interconnected processors.

According to one or more embodiments of the invention, an application external to the system 200 (e.g., a client application), is able to perform a variety of functions with regard to haptic effects to be output by the haptic device by using the interface component 202 to access the functionality of the system 200 shown in FIG. 2. For example, an application can create, modify, or delete effect signals, which are configured to cause corresponding effects, using the interface component 202. Additionally, an application can start and stop effects on the haptic device 116 via the interface component 202. According to one or more embodiments of the invention, the interface component 202 can allow a client application to modify haptic effects in realtime, or "on the fly," while the effect is being implemented. Such an ability can be facilitated, for example, by way of feedback using a sensor, such as the sensor 118 (shown in FIG. 1), or by way of optional feedback to various components within the system (e.g., shown using dashed lines in FIG. 2).

The interface component 202 is in communication with a communication bridge 204, which is configured to provide access between the interface component 202 and the remaining components of the system 200. For example, according to one or more embodiments of the invention where the interface component 202 resides on a first processor and the remaining components of the system 200 shown in FIG. 2 reside on a second processor, the communication bridge 204 provides a connection between the first and second processors. For example, the communication bridge 204 can use a known protocol for communicating between multiple processors, such as a universal serial bus (USB) interface, or other suitable protocol.

According to one or more embodiments of the invention, the communication bridge 204 is optional and can be omitted, if desired. For example, the interface component 202 and the remaining components of the system 200 shown in FIG. 2 (usually excluding the communication bridge 204) can run on a single processor. In such an implementation, the communication bridge 204 may not be necessary. For example, the interface component 202 can be configured to communicate directly with the communication bridge 204. Although a hardware communication bridge 204 may not be needed between two software components on a single processor, a software communication bridge 204 can be used in such a situation, if desired. Accordingly, the communication bridge 204 is entirely optional, and can be modified to include a software communication bridge 204, depending upon the desired implementation of the system 200.

A driver 206 coordinates communication between various components of the system 200, including an output component 208, a resource manager 210, an ordering component 212, and an output register 214. The driver 206 queries these components for action items, and coordinates communications and data transfer between the components according to existing action items. The driver 206 also communicates with the interface component 202 (e.g., via the communication bridge 204, or otherwise), whereby it can receive and handle requests from, or communicate data to client applications external to the system 200.

According to one or more embodiments of the invention, the driver 206 coordinates various time-sensitive operations of the various components (e.g., the output component 208, the resource manager 210, and the ordering component 212) of the system 200 with which it communicates. To this end, the driver 206 can query various components of the system 200 at relatively short time intervals, such as one-millisecond (ms) or 0.5-ms intervals. Of course, the length of time intervals the driver 206 uses to query components can be modified according to various application requirements for which the system 200 is to be used.

The driver 206 communicates with an output component 208, which uses various control algorithms to cause the haptic device 116 to output specified haptic effects during their associated time slots. The output component 208 outputs basis haptic-effect signals, which are configured to cause haptic effects (e.g., periodic effects, magnitude sweep effects, etc.) to be output by haptic device 116. The output component 208 can modify basis haptic-effect signals, for example, by varying specific parameters of the haptic effects to be output by the haptic device 116. For example, the output component 208 can use control algorithms to specify or vary intensity, periodicity, ramp-up time, ramp-down time, and other parameters of the haptic effects that to be output by the haptic device 116.

The output component 208 can be configured to output multiple haptic effect signals simultaneously. For example, according to one or more embodiments of the invention, the output component 208 can output up to four basis haptic-effect signals, simultaneously, each of which is configured to cause a different haptic effect to be output by the haptic device 116. These multiple basis haptic-effect signals can occupy multiple corresponding "effect slots" within the output component 208, which are used to differentiate the various signals that can be output simultaneously by the output component 208. Thus, the output component 208 associates each haptic effect with an effect slot (e.g., by associating a corresponding basis haptic-effect signal with an effect slot) during the time slots associated with the haptic effects. According to one or more embodiments of the invention where the output component 208 is capable of outputting four basis haptic-effect signals simultaneously, the output component 208 can include four effect slots. It will be appreciated, however, that the number of effect slots within the output component 208 can be varied based on a number of factors.

A resource manager 210 communicates with the output component 208, and acts as a supporting component for the output component 208. Specifically, the resource manager 210 manages the output component 208 and haptic-effect signals to be output by the output component 208 by controlling the timing with which a specific haptic effect is to be output. In response to control signals from the resource manager 210, the output component 208 generates a basis haptic-effect signal (e.g., which can be communicated to the driver 206 in the form of a pulse-width modulation signal) configured to cause the haptic effect to be output, as directed by the resource manager 210. The driver 206 can then pass this basis haptic-effect signal, as described below, to other components of the system 200 to cause the haptic device 116 to output the desired haptic effects.

According to an embodiment where the output component 208 has multiple effect slots, the resource manager 210 can determine which slot should be filled with which effect signals. This can occur, for example, based on a time slot associated with the haptic effect. Generally, the resource manager 210 will cause an effect signal for a new effect to be placed into the next available slot in the output component 208. When all of the effect slots within the output component 208 are active (i.e., outputting a haptic-effect signal), and none are available, the resource manager 210 determines which of the effect signals currently being output should remain, and which effect signals within the output component 208, if any, should be replaced by a new haptic-effect signal.

When a new haptic-effect signal is desired and all of the effect slots of the output component 208 are already active, the resource manager 210 can examine the effects in each of the effect slots of the output component 208 to determine the amount of time remaining for each effect signal being output. The resource manager 210 can, additionally or alternatively, determine a priority between multiple effects. Based at least partially on one or more such determinations, the resource manager 210 can determine whether a haptic-effect signal currently being output (i.e., an active haptic-effect signal), should be removed to allow a new haptic-effect signal to be inserted in an effect slot (i.e., to be output by the output component 208), or whether the active haptic-effect signal should remain, and have priority over, a new haptic-effect signal. Priority can be determined, for example, on the basis of the time remaining for the active effect signal, or on the basis of a predetermined parameter, such as a priority level previously assigned to an effect signal, or other parameters. According to one or more embodiments of the invention, the resource manager 210 can simply remove an effect being executed by the output component 208 that has the least time remaining so that execution of a new effect by the output component 208 is facilitated.

The ordering component 212 performs as a sequencer, providing a timeline for the driver 206 to use in outputting the basis haptic-effect signals produced by the output component 208. Specifically, the ordering component 212 provides an order and timing for each of the basis haptic-effect signals to be executed by the output component 208. For example, the ordering component 212 can interpret a series of instructions, which can be presented in the form of a timeline-effect file or a timeline haptic effect signal, and issue commands regarding which basis haptic-effect signals are to be output at certain times, and in which order those signals are to be output. This can occur, for example, based on a time slot associated with each haptic effect to be output using a basis haptic-effect signal, which can be defined in a file or other signal (e.g., received from outside the system 200). It is using such commands from the ordering component 212 that the resource manager 210 can determine which basis effect-signals are to be output at specific times by the output component 208 to cause basis haptic effects to be output by the haptic device 116 at desired times. According to one or more embodiments of the invention, the ordering component 212 issues commands at least partially based on a timeline-effect file received from a client application outside of the system 200 via the interface component.

According to one or more embodiments of the invention, the driver 206, the output component 208, the resource manager 210 and the ordering component 212 can run on a single processor, which is different from the processor upon which the interface component 202 runs. As mentioned above, these two processors can be interconnected by way of a physical, hardware communication bridge 204. According to one or more embodiments of the invention, each of these processors can be similar to the processor 112 (shown in FIG. 1), and can be within a single processor system 110 (shown in FIG. 1) or among multiple processor systems 110. Alternatively, however, the interface component 202 can run on the same processor as the driver 206, the output component 208, the resource manager 210, and the ordering component 212. Depending upon the specific implementation, the communication bridge 204 can be implemented in the form of a software component rather than a hardware component, to communicate between the interface component 202 and the driver 206.

An output register 214 can be used by the system 200 to receive the ordered, basis haptic-effect signals, which can be represented, for example, in the form of a timeline haptic-effect signal. According to one or more embodiments of the invention, the output register 214 can be a hardware device, such as a pulse width modulation (PWM) output register configured to receive and/or output a PWM signal, or other suitable output register device.

The ordered, basis haptic-effect signals are communicated from the output register 214 to the device driver 216. The device driver 216 can be a hardware device, according to one or more embodiments of the invention. For example, the device driver 216 can include electronic components and circuitry used to supply the haptic device 116 with the required electric current to cause the ordered haptic-effect signals specified in the output register 214 to output corresponding haptic effects on the haptic device 116. For example, the current provided by the device driver 216 to the haptic device 116 can have varying magnitudes of positive and negative current. Additionally, or alternatively, the current can be in the form of periodic signals with varying periods and/or phases, which correspond to the characteristics of the series of ordered haptic effects stored in the output register 214.

Figure 3:
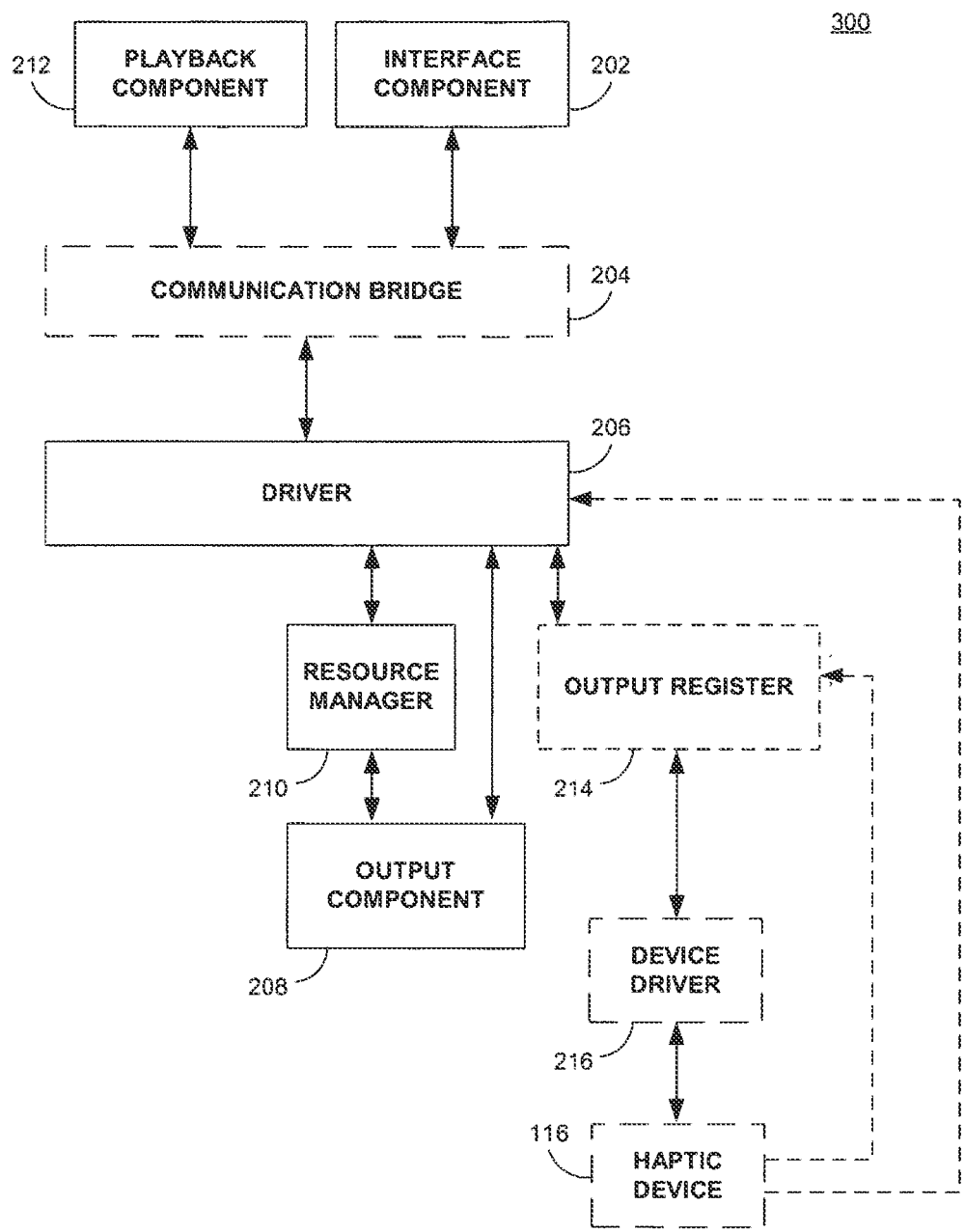
FIG. 3 is a block diagram of a system configured to order haptic effects, according to another embodiment of the invention.
Figure 4:
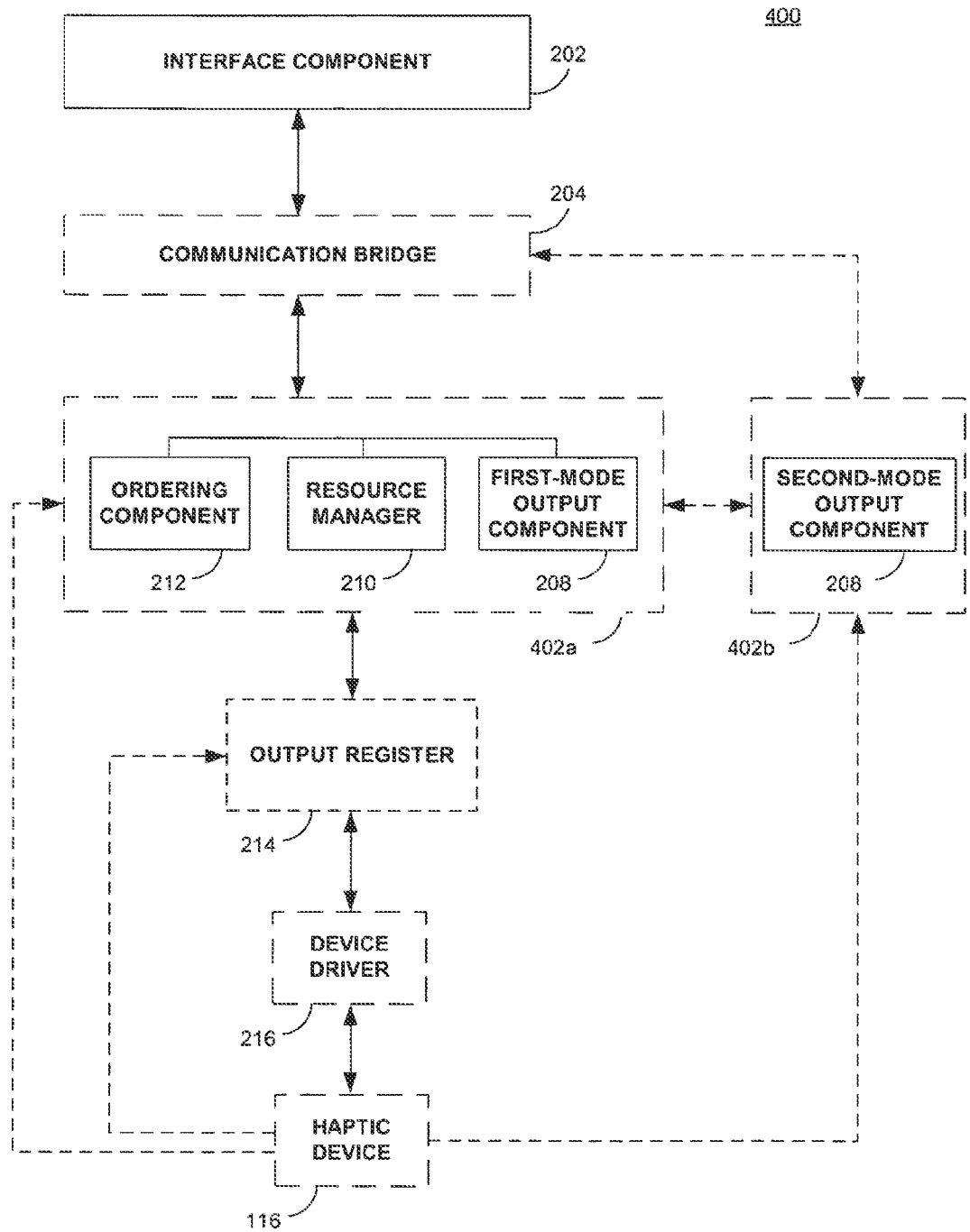
FIG. 4 is a block diagram of a system configured to order haptic effects, according to another embodiment of the invention.

The configuration of the system 200 shown in FIG. 2 can be modified in many ways according to the desired performance of the system 200. For example, various components shown in FIG. 2 can be omitted or combined. Moreover, additional components can be added to the system 200 shown in FIG. 2. Two examples of alternate configurations of the system 200 shown in FIG. 2 are illustrated in FIG. 3 and FIG. 4. These alternate configurations, however, are merely examples of possible implementations, and are not intended to exhaustively demonstrate all possible configurations.

FIG. 3 is a block diagram of a system configured to order haptic effects, according to another embodiment of the invention. The system 300 shown in FIG. 3 is similar to the system 200 of FIG. 2, but does not include an ordering component 212 (shown in FIG. 2). Rather, any ordering of haptic-effect signals, or assigning of haptic-effect signals to effect slots can be accomplished using the resource manager 210, which also manages the resources of the output component 208, as discussed above. Thus, the resource manager 210 can manage both time slots and effect slots associated with haptic effects to be output, according to one or more embodiments of the invention.

FIG. 4 is a block diagram of a system configured to order haptic effects, according to another embodiment of the invention. The system 400 shown in FIG. 4 is similar to the system 200 of FIG. 2 with some differences. For example, the system 400 of FIG. 4 is configured to operate in a "multi-mode" configuration. More specifically, multiple modes of output can be processed and output simultaneously using the system 400 of FIG. 4.

For example, multiple processing components 402a, 402b (sometimes referred to collectively or individually as processing component(s) 402) can receive signals (e.g., from the interface component 202, via the communication bridge 204, etc.) and can order haptic-effect signals configured to cause haptic effects to be output. The ordered haptic-effect signals can be output to the output register 214, the device driver 216, and/or the haptic device 116. Although only two processing components 402 are shown, more can be included to provide additional modes, if desired. Additionally, each of the processing components 402 is optional, and can, instead, be implemented as a collection of other components. Each of the processing components 402 can access the functionalities of its individual components, which can include, for example, a resource manager 210, an ordering component 212, and/or an output component 208, among other components.

The multi-mode system 400 shown in FIG. 4 uses a first-mode output component 208a included in the first processing component 402a to process and output information associated with a first mode, and a second-mode output component 208b included in the second processing component 402b. According to one or more embodiments of the invention, the first-mode output component 208a can be configured to cause haptic effects to be output in the manner described above. The output caused by the first-mode output component 208a can be synchronous with the output caused by the second-mode output component 208b. For example, according to one or more embodiments of the invention, the second-mode output component 208b can be configured to cause non-haptic output, such as audio output (e.g., from MIDI files, WAV files, etc.), video output, or other suitable output. According to one or more embodiments of the invention, output caused by the second-mode output component 208b can be created according to an event-driven set of instructions (e.g., a MIDI file), and the haptic effects caused by the first-mode output component 208a can be created based on the event-driven set of instructions either manually, or by automatic conversion, as will be described below in greater detail. By using such a multi-mode system 400, synchronicity between the multiple modes produced by the system 400 can be achieved.

Figure 5:
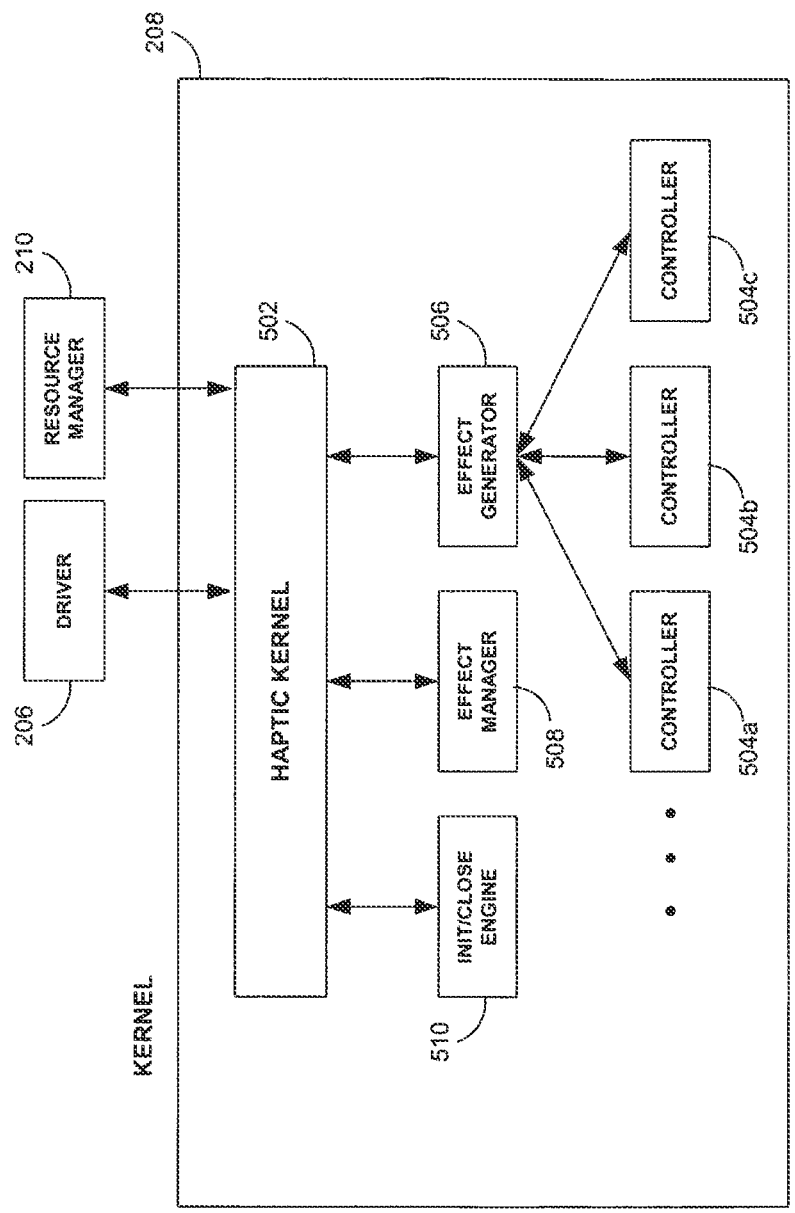
FIG. 5 is a block diagram of an output component, according to an embodiment of the invention.

FIG. 5 is a block diagram of an output component, according to an embodiment of the invention. The output component 208 and its components are illustrated in detail in FIG. 5, where the output component 208 is shown in communication with the driver 206 and the resource manager 210, in the same configuration shown in FIG. 2. The output component 208 includes a haptic output component 502, by which the driver 206 and the resource manager 210 communicate with the output component 208. The haptic output component 502 can make use of various algorithms within the output component 208 to package various data packets that are to be communicated to the driver 206 or the resource manager 210 from other components within the output component 208.

The output component 208 can include one or more controllers 504a, 504b, 504c (collectively, individually, or as a subset referred to herein as controller(s) 504). Each of the controllers 504 within the output component 208 communicate with an effect generator 506, which is in communication with the haptic output component 502. The controllers 504 can make use of an algorithm within the output component 208 to cause a basis haptic-effect signal to be output. The effect generator 506 can monitor the controllers 504 and track timing between the various controllers 504. The effect generator 506 can also communicate effect timing (e.g., the time remaining for an effect, etc.) to the haptic output component 502, which can communicate this information to the resource manager 210 to allow the resource manager 210 to manage the basis haptic-effect signals output by the output component 208. Additionally, basis haptic-effect signals provided by the controllers 504 to the effect generator cause the effect generator 506 to output a value selected to cause the haptic device 116 (shown in FIGS. 1 and 2) to output a basis haptic effect. For example, according to one or more embodiments of the invention, the effect generator 506 can output a PWM value, that can be interpreted by the output register 214 (shown in FIG. 2), after being received from the driver 206. The output register 214 can use this value to cause the device driver 216 to drive the haptic device 116.

The output component 208 also includes an effect manager 508 that can be used by the haptic output component 502 to process communications received from the driver 206. For example, according to one or more embodiments, packets from the driver 206 containing encoded effect parameters (e.g., as part of a basis haptic-effect signal) can be processed by the effect manager 508. This can include, for example, receiving and parsing the received communications, and extracting values encoded within those communications, which can then be converted to useful formats, if necessary. The extracted and/or converted values can be stored in one or more internal memory locations to be used by the effect generator 506 in generating the appropriate signal to cause a corresponding commanded haptic effect to be output. According to one or more embodiments of the invention, the effect manager 508 decodes time-related values that are received in an encoded format from the driver. Additionally, the effect manager 508 can handle or modify information that affects behavior of various components of the output component 208 and the system 200 (shown in FIG. 2) in which it is employed. For example, the effect manager 508 can modify various parameters used to determine force values to be output by a haptic device 116 (shown in FIG. 2). This can be accomplished, for example, using a linearization table that is used to convert haptic-effect signal parameters to force values. Using such a linearization table, the effect manager 508 can change the amount of force calculated by the effect generator 506 to be output for corresponding haptic-signal values.

The output component 208 also includes an INIT/close engine 510, which initializes all structures or variables used by the controllers 504, the effect generator 506, and the effect manager 508. The INIT/close engine 510 also ensures that the driver 206 provides a valid memory location for writing force values associated with the haptic-effect signals (e.g., as calculated by the effect generator 506). Additionally, the INIT/close engine 510 ensures that all memory at termination time (e.g., after all haptic-effect signals have been output) is properly reset.

Figure 6:
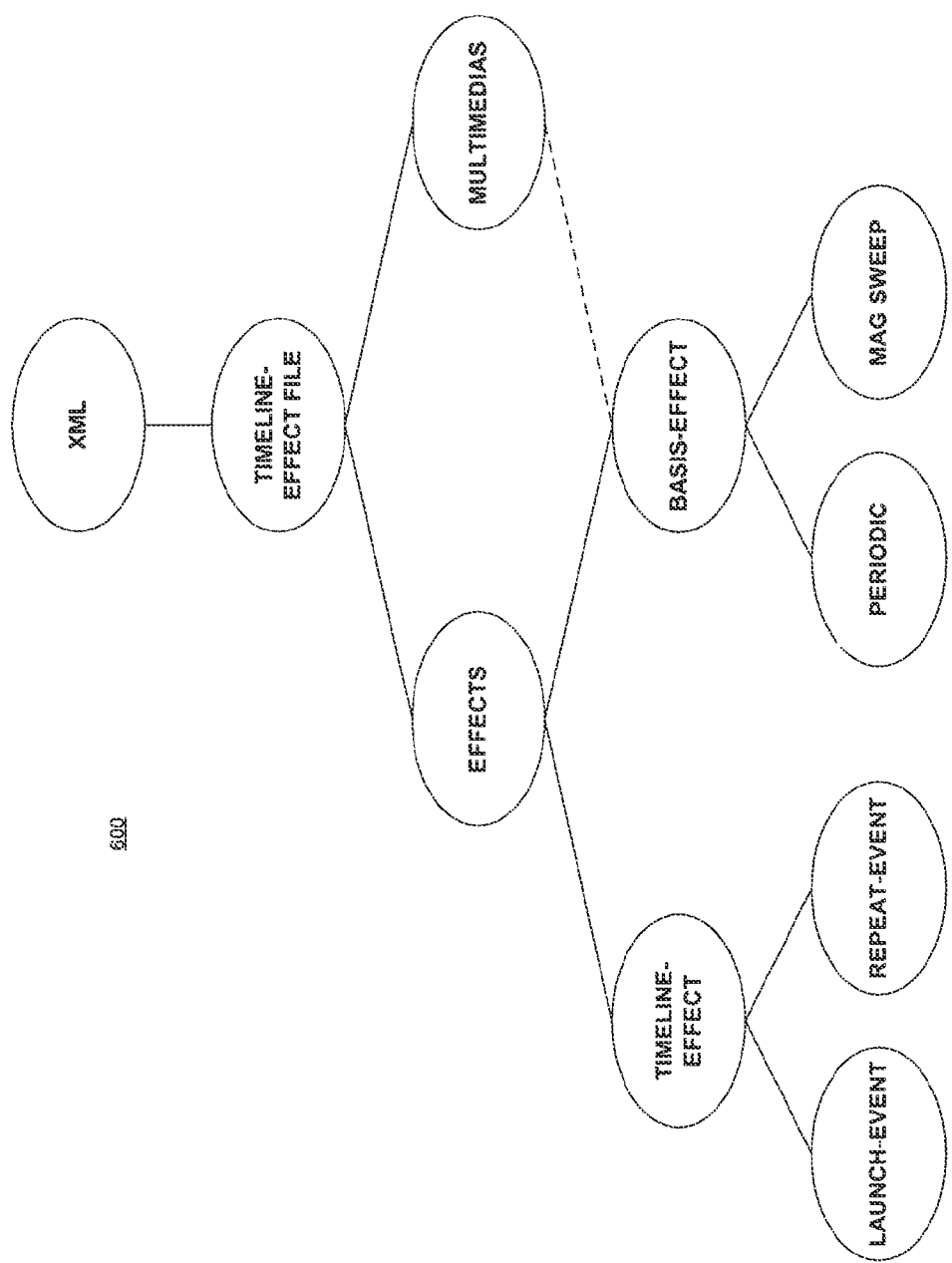
FIG. 6 is a block diagram of a file structure, according to an embodiment of the invention.

FIG. 6 is a block diagram of a file structure, according to an embodiment of the invention. More specifically, in FIG. 6, a hierarchy 600 of a file structure used to order multiple, basis haptic effects to create timeline haptic-effect signals is illustrated. A file structured according to the hierarchy 600 shown in FIG. 6 can be used, for example, by the ordering component 212 to determine the order and timing of basis haptic effects to be executed by the haptic device 116. It will be appreciated, however, that the hierarchy 600 shown in FIG. 6 is only one possible implementation. According to one or more embodiments of the invention, the hierarchy 600 shown in FIG. 6 can be varied, or replaced by another hierarchy suitable for the desired function of the implementation in which is it used. Files having the hierarchy 600 shown in FIG. 6 can be created or modified by a client application, which can access the functionality of the system 200 shown in FIG. 2 by way of the interface component 202 of that figure.

As shown in the hierarchy 600 of FIG. 6, a timeline-effect file can be created and/or saved in extensible markup language (XML). According to one or more other embodiments of the invention, however, the timeline-effect file can be created and/or stored in another format, such as other markup languages, binary, or other suitable formats, depending upon on the desired implementation or design constraints. The timeline-effect file defines two separate classes, "effects" and "multimedias."

The effects class includes a timeline-effect subclass and a basis-effect subclass. Two types of basis effects are defined: periodic and magnitude sweep (also referred to as "mag sweep" effects). Periodic effects are effects that provide periodic sensations, such as periodic vibrations, or similar effects. Periodic effects can be driven using a periodic drive signal (e.g., sinusoidal signal, square-wave signal, etc.). Periodic effects can also be driven using constant signals that cause periodic motion (e.g., a direct-current drive signal that causes a motor to spin, etc.). Magnitude sweep effects are effects that provide a certain sensation magnitude or group of magnitudes (e.g., a constant force, a constant resistance, etc.).

Two events of timeline effects are defined: a launch event and a repeat event. A launch event specifies a basis haptic-effect signal and a time at which the haptic effect corresponding to the basis haptic-effect signal is to be started, or launched. A repeat event specifies a start time and a duration during which events are to be repeated a specified number of times.

Another class of effects, called "multimedias" can optionally include the basis-effect subclass. This class of effects is used, for example, to synchronize effects, such as basis haptic effects, with multimedia files (e.g., MIDI files, WAV files, MP3 files, etc.). The "multimedias" class causes the basis haptic effects to be output simultaneously and synchronously with the corresponding multimedia file. Thus, by using an authoring tool according to one or more embodiments of the invention, a "multimedias" class can be designed such that when music from a media file is output by a device, one or more basis haptic effects can be output by a haptic device (e.g., integral to the device outputting the music) synchronously with the multimedia file. This can be accomplished, for example, using a multi-mode system 400 (shown in FIG. 4). According to one or more embodiments of the invention, the timeline-effect files structured according to the hierarchy 600 shown in FIG. 6 are illustrated in greater detail in FIGS. 7, 8, and 9.

Figure 7:
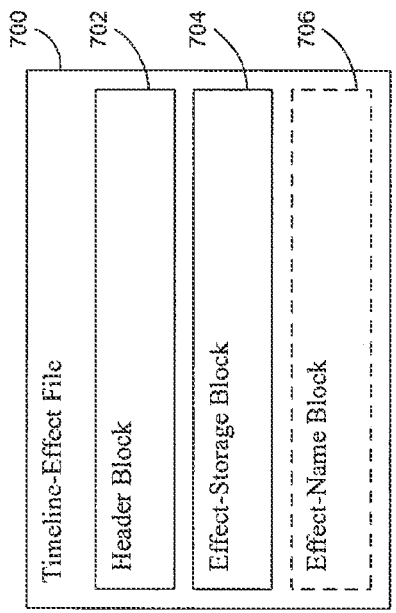
FIG. 7 is a block diagram of a timeline-effect file structure, according to an embodiment of the invention.

FIG. 7 is a block diagram of a timeline-effect file structure, according to an embodiment of the invention. A timeline-effect file 500 can be configured for use by a client application (e.g., an application accessing the system 200 of FIG. 2, and application of an embedded system, etc.) to create a timeline-effect signal, or an ordered series of basis haptic-effect signals. The timeline-effect file 500 shown in FIG. 7 can include a header block 702, which contains a definition of the timeline-effect signal to cause a desired, ordered series or basis haptic effects to be output by the haptic device 116. The header block 702 can also include information regarding the format version and size of the timeline-effect file 500, the number (and order of) basis haptic effects to be generated by the timeline-effect signal, and the location of other blocks within the timeline-effect file 500, such as the effect-storage block 704 and the optional effect-name block 706.

In addition to the header block 702, the timeline-effect file 500 can also include an effect-storage block 704 and an optional effect-name block 706. The effect-storage block 704 contains information regarding each effect (e.g., basis haptic effect or timeline, haptic effect, etc.) defined in the timeline-effect file 500. For example, according to one or more embodiments of the invention, the effect-storage block 704 can contain definitions of each effect within the timeline-effect file 500. The optional effect-name block 706 can be used to store the names of each of the effects within the timeline-effect file 500. Table 1 below shows a header that can be used as the header block 702 of the timeline-effect file 500, according to an embodiment of the invention.

TABLE 1

Header Block 702

| Byte | Contents | Meaning |
|---|---|---|
| 0 | 0x01 | Major Version number (e.g., 1 for file format 1.x). |

TABLE 1-continued

Header Block 702

| Byte | Contents | Meaning |
|---|---|---|
| 1 | 0x00 | Minor Version number (e.g., 0 for IVT file format x.0). |
| 2 | EFFECTCOUNT_15_8 | Number of effects, bits 15 to 8. |
| 3 | EFFECTCOUNT_7_0 | Number of effects, bits 7 to 0. |
| 4 | ESBSIZE_15_8 | Bits 15 to 8 of the Effect-Storage Block size in bytes. |
| 5 | ESBSIZE_7_0 | Bits 7 to 0 of the Effect-Storage Block size in bytes. |
| 6 | ENBSIZE_15_8 | Bits 15 to 8 of the Effect-Name Block size in bytes. |
| 7 | ENBSIZE_7_0 | Bits 7 to 0 of the Effect-Name Block size in bytes. |

Figure 8:
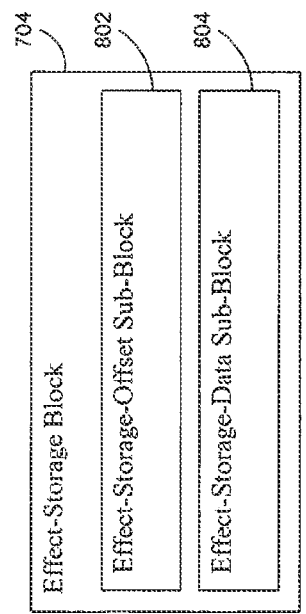
FIG. 8 is a block diagram of an effect-storage-block file structure, according to an embodiment of the invention.

FIG. 8 is a block diagram of an effect-storage-block file structure, according to an embodiment of the invention. As shown in FIG. 8, the effect-storage block 704 includes an effect-storage-offset sub-block 802 and an effect-storage-data sub-block 804. The effect-storage-offset sub-block 802 defines where each effect begins in the timeline-effect file 500. Specifically, according to one or more embodiments of the invention, the effect-storage-offset sub-block 802 is an array of offsets, each of which corresponds to a separate effect defined within the timeline-effect file 500. Each offset within the array can include two bytes of information that specify where the definition for each effect begins in the effect-storage-data sub-block 804. According to one or more embodiments of the invention, the size of the effect-storage-offset sub-block 802 includes a number of bytes that is twice the number of total effects defined in the timeline-effect file 500.

The effect-storage-data sub-block 804 stores the definitions of each of the effects defined in the timeline-effect file 500, including, for example, basis haptic effects and timeline effects. Each type of effect stored in the effect-storage-data sub-block 804 can be stored in a manner that renders it easily identifiable. For example, according to one or more embodiments of the invention, the least significant "nibble," or four bits, of data of each effect can contain a specified value depending upon the type of effect it is. For example, the least significant nibble of the basis haptic effects can have a value of 0x0, while the least significant nibble of the timeline effects can have 0xF.

Figure 9:
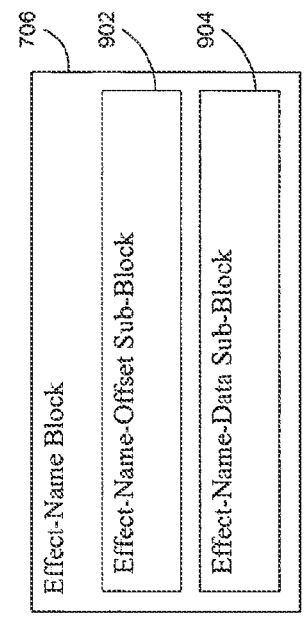
FIG. 9 is a block diagram of an effect-name block file structure, according to an embodiment of the invention.

FIG. 9 is a block diagram of an effect-name-block file structure, according to an embodiment of the invention. As shown in FIG. 9, the optional effect-name block 706 includes an effect-name-offset sub-block 902, and an effect-name-data sub-block 904. The effect-name-offset sub-block 902 can include an array of offsets, each of which corresponds to an effect defined within the timeline-effect file 500. As with the effect-storage-offset sub-block 802, the size of each offset within the effect-name-offset sub-block 902 can be two bytes, such that the total size of the effect-name-offset sub-block 902 includes a number of bytes that is twice the number of total effects defined in the timeline-effect file 500. Each offset in the effect-name-offset sub-block 902 specifies where the name of the corresponding to the effect is located in the effect-name-data sub-block 904. The effect-name-data sub-block 904 stores the effect names of each effect defined by the timeline-effect file 500.

Figure 10:
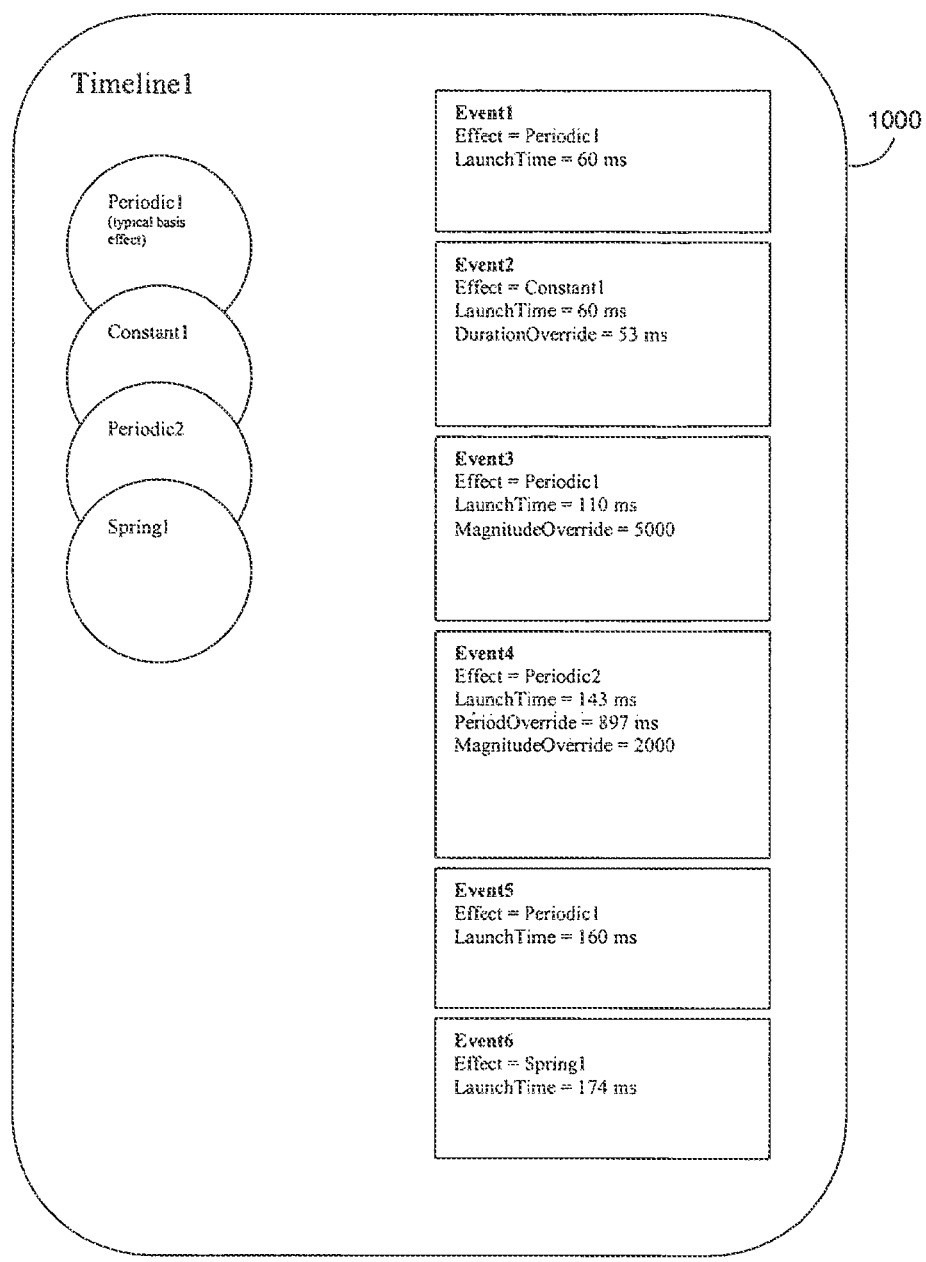
FIG. 10 is a block diagram of a timeline-effect definition, according to an embodiment of the invention.

FIG. 10 is a block diagram of a timeline-effect definition, according to an embodiment of the invention. Specifically, the timeline-effect definition 1000 of a first timeline haptic effect ("Timeline1") is illustrated in FIG. 10. On the left-hand side of the timeline-effect definition 1000 are several circles that each correspond to a unique basis haptic effect and are to be included in the first timeline haptic effect (e.g., including a first and second periodic effect, a constant effect, and a spring effect, etc.). On the right-hand side of the timeline-effect definition 1000, the basis haptic effects are shown in an ordered fashion, as events. Each event indicates the basis haptic effect and the launch time when that effect is to begin within the timeline effect. In other words, timeline-effect definition 1000 is configured to output a series of ordered, basis haptic-effect signals, each of which corresponds to the basis haptic effect defined in the timeline-effect definition 1000, and each of which begins at a launch time indicated in the timeline-effect definition 1000.

As shown in FIG. 10, the various ordered series of basis haptic-effect signals, shown on the right-hand side of the timeline-effect definition 1000 as events, can specify additional information. For example, certain override values can be specified for the various basis haptic-effect signals (e.g., a duration override, a magnitude override, a period override, etc.), which set a value different from a default value for one or more parameters of the basis haptic-effect signal. Additionally, priorities can be set for each of the basis haptic-effect signals to aid the resource manager 210 (shown in FIG. 2) in determining which effect signals have priority over others to occupy effect slots within the output component 208.

Figure 11:
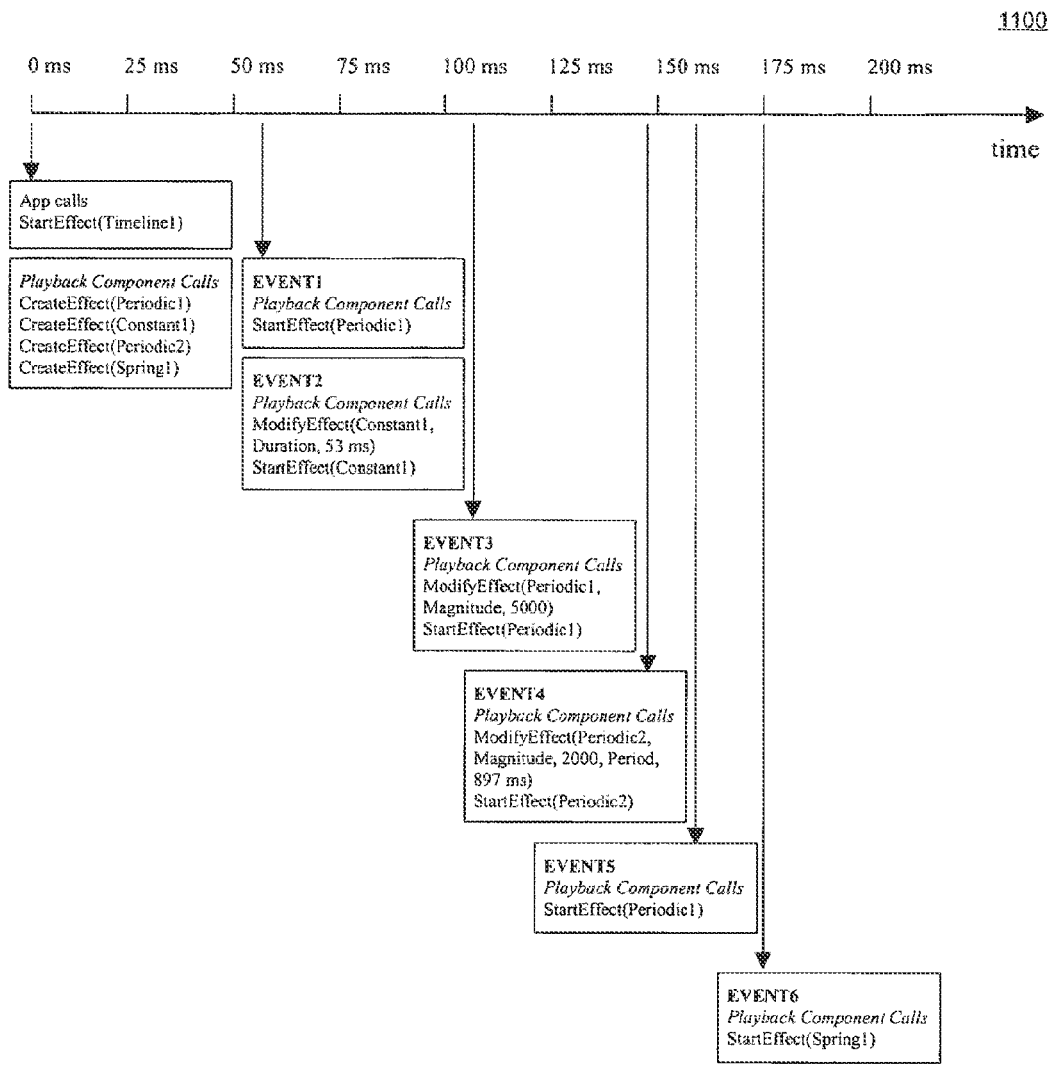
FIG. 11 is a timeline diagram illustrating the execution of multiple, basis haptic effects, according to an embodiment of the invention.

FIG. 11 is a timeline diagram illustrating the execution of multiple, basis haptic effects, according to an embodiment of the invention. The example of a timeline 1100 shown in FIG. 11 illustrates the manner in which the system 200 (shown in FIG. 2) causes the output component 208 (shown in FIG. 2) to implement a timeline effect (e.g., the ordered basis haptic effects) specified in a timeline-effect definition 1000 (shown in FIG. 10). First, an application (e.g., a client application accessing the system 200 of FIG. 2) calls for the first timeline effect Timeline 1 to be started. In response, the ordering component 210 (shown in FIG. 2) creates or instantiates each of the basis haptic-effect signals defined in the timeline-effect definition (e.g., a first and second periodic effect, a constant effect, and a spring effect, etc.). Once each basis haptic-effect signal is created or instantiated, the ordering component proceeds to call each basis haptic-effect signal in the order and at the time specified in the timeline-effect definition 1000 (shown in FIG. 10), implementing any override values for each basis haptic-effect signal.

FIG. 12 is block diagram of memory addresses for multiple, basis haptic effects, according to an embodiment of the invention. The compact basis-effect-storage block 1200 shown in FIG. 12 can be used to implement a compact storage schema for storing multiple, basis haptic effects where space is a premium (e.g., in embedded applications, etc.). In the compact basis-effect-storage block 1200, only two types of messages, or instructions, are stored: a SetPeriodic message and a SetPeriodicModifier message. Each of these messages can be used to store definitions of basis haptic-effect signals (e.g., periodic haptic-effect signals, constant haptic-effect signals, etc.). When stored as part of a timeline effect signal, each of these messages can be padded to 8 bytes in length. The SetPeriodic message can call for the execution of a basis haptic effect, by way of a corresponding, specified basis haptic-effect signal. The SetPeriodicModifier message operates to modify the SetPeriodic message (e.g., providing an envelope for the basis haptic-effect signal, etc.).

The compact basis-effect-storage block 1200 includes multiple basis haptic-effect signals, each of which can have lengths of either 8 bytes (e.g., an unmodified SetPeriodic message) or 16 bytes (e.g., a SetPeriodic message modified by a SetPeriodicModifier message). Thus, in the compact basis-effect-storage block 1200, multiple basis haptic-effect signals can be ordered in a predetermined order, and stored using an index (e.g., 0, 1, and 2, for the effect signals "Effect0," "Effect1," and "Effect 2," respectively, each shown on the left-hand side of FIG. 12) and a relative memory address location (e.g., 0x0000, 0x0008, 0x0010, etc.). The index and relative memory address location can be used by the output component 208 (shown in FIG. 2) to call the basis haptic-effect signals in order, and to cause the corresponding basis haptic-effect signals to be executed in that order.

Figure 13:
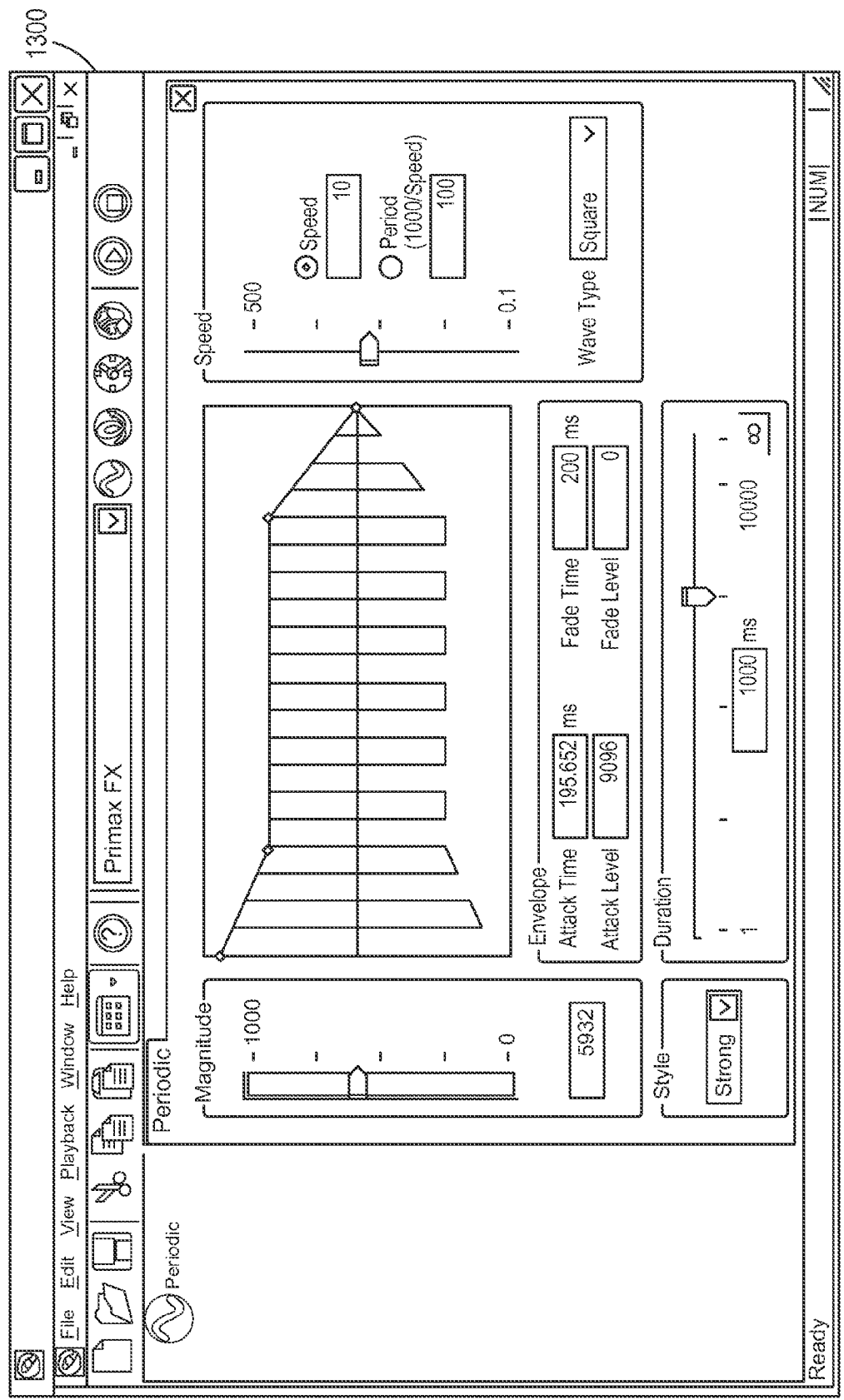
FIG. 13 is a diagram of a computer window of an application for modifying a periodic haptic effect, according to an embodiment of the invention.

FIG. 13 is a diagram of a computer window of an application for modifying a periodic haptic effect, according to an embodiment of the invention. Similar windows can be provided for modifying other types of basis haptic effects. The modification computer window 1300 shown in FIG. 13 is an interface that can form, for example, a part of a client application configured to create or modify haptic effects. Such a client application can, for example, access the system 200 (shown in FIG. 2) by way of the interface component 202. According to one or more embodiments of the invention, the modification computer window 1300 (or the other computer windows described below) can form part of a stand-alone computer application program. Alternatively, according to one or more other embodiments of the invention, the modification computer window 1300 (or the other computer windows described below) can form part of or interface with an existing computer application program (e.g., can be a plug-in, etc.). For example, the modification computer window 1300 (or the other computer windows described below) can form part of system described in U.S. Pat. Nos. 5,959,613 and 6,278,439 to Rosenberg et al., entitled, "Method and Apparatus for Shaping Force Signals for a Force Feedback Device," each of which is incorporated by reference herein in its entirety.

The effect being created in the modification computer window 1300 shown in FIG. 13 is a periodic effect, and is represented by the periodic effect icon on the left-hand side of the window 1300. That periodic effect fades in magnitude from a maximum magnitude value over time, becomes constant for a period of time, and subsequently fades to zero magnitude. Various parameters can be changed by way of the modification computer window 1300 shown in FIG. 13, such as the magnitude, style, attack time, attack level, fade time, fade level, duration, speed, and period of the haptic effect. It is by way of such a modification computer window 1300 that individual desired basis haptic effects can be tailored, such that a tailored corresponding basis haptic-effect signal is created. Once the basis corresponding haptic-effect signal is created, it can be placed within a timeline haptic-effect signal, to be implemented at a desired time and in a desired order relative to other basis haptic-effect signals within the timeline haptic-effect signal.

Figure 14:
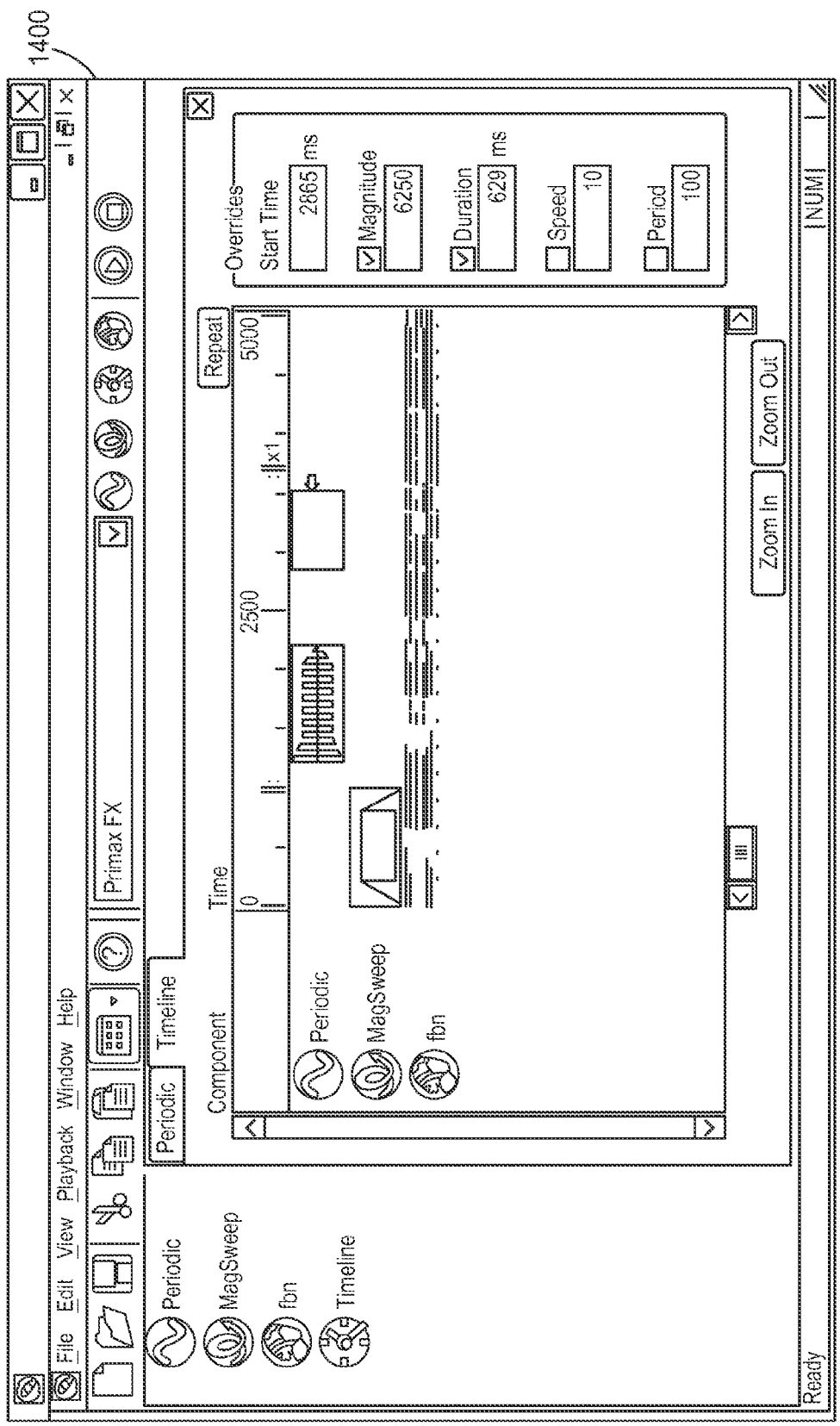
FIG. 14 is a diagram of a computer window of an application for ordering multiple, basis haptic effects to form a timeline haptic effect, according to an embodiment of the invention.

FIG. 14 is a diagram of a computer window of an application for ordering multiple, basis haptic effects to form a timeline haptic effect, according to an embodiment of the invention. In FIG. 14, a timeline effect computer window 1400 is shown allowing multiple, basis haptic effects to be organized into a timeline haptic effect. For example, on the left-hand side, several icons corresponding to different types of effects are shown, including a periodic haptic effect, a magnitude-sweep haptic effect, and a timeline haptic effect. These effects can be modified in a window similar to the modification computer window 1300 (shown in FIG. 13)

discussed above. The MIDI file entitled "fbn" is also shown on the left-hand side of the timeline effect computer window 1400. The MIDI file is also graphically represented in the main portion of the timeline effect computer window 1400 along with the various effects to be output synchronously with the MIDI's audio output. More specifically, in the main portion of the timeline effect computer window 1400, graphical representations of notes and channels are shown at various times along the timeline.

Each of the icons shown on the left-hand side of the timeline effect computer window 1400 can be interacted with via the graphical user interface (GUI) in which the timeline effect computer window is presented. For example, a user can "drag-and-drop" an icon into the timeline haptic effect being constructed in the main portion of the window, or to exchange MIDI files to be output synchronously with such effects. Each effect that forms part of the timeline haptic effect can be highlighted, and parameters of that effect can be adjusted. For example, the periodic effect that is highlighted has override fields on the right for specifying start time (which can also be specified or altered in drag-and-drop fashion), magnitude, and duration. Other override values, which are not set for the highlighted periodic effect can also be used with other effects (e.g., speed, period, etc.). Additional detail of each effect can also be viewed by "double clicking" on the effect or its icon (e.g., detail similar to the detail shown in FIG. 13).

Figure 15:
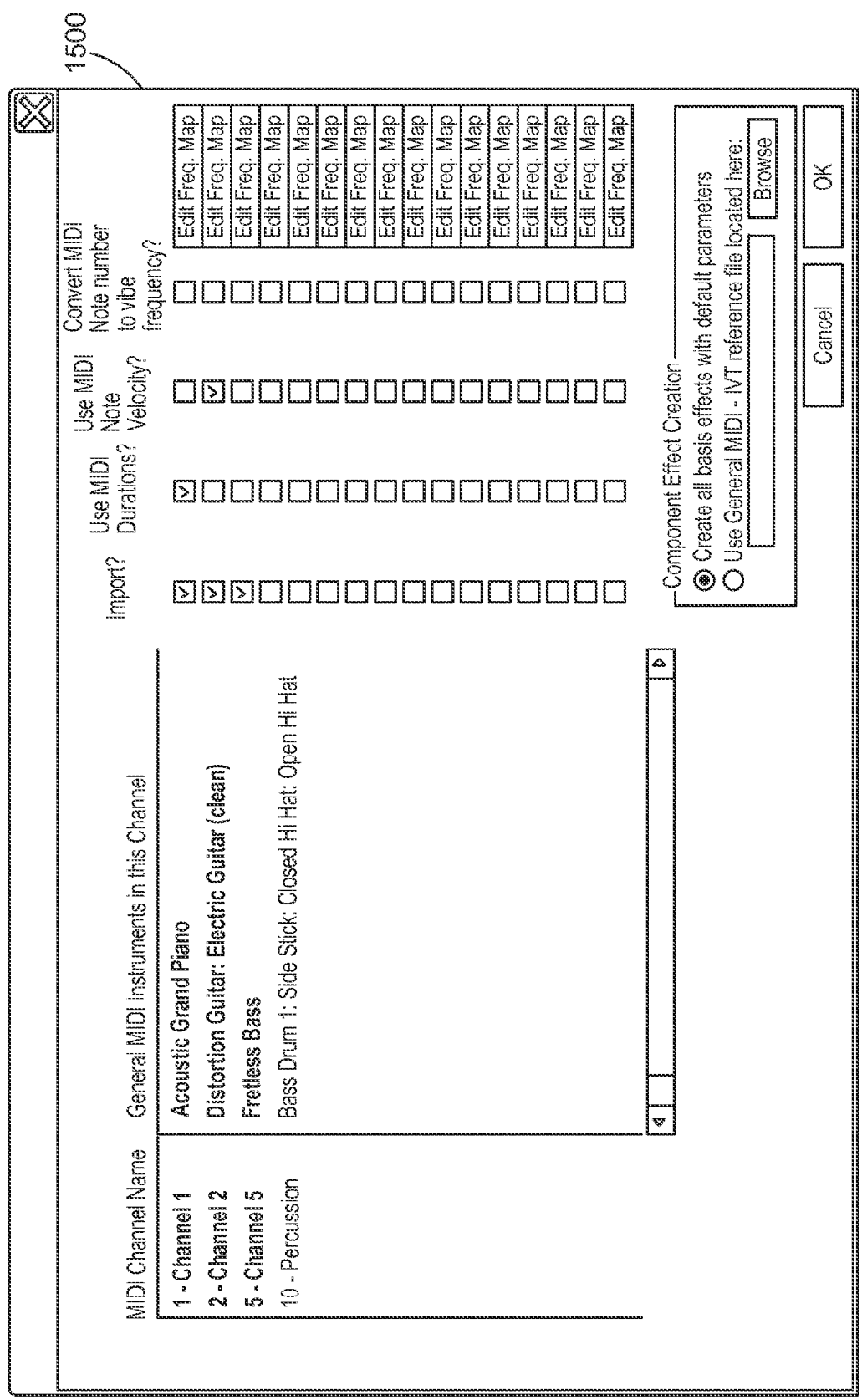
FIG. 15 is a diagram of a computer window of an application for creating a haptic effect from a sound file, according to an embodiment of the invention.

FIG. 15 is a diagram of a computer window of an application for creating a haptic effect from a sound file, according to an embodiment of the invention. According to one or more embodiments of the invention, a sound file (e.g., a MIDI file) can be automatically converted to one or more timeline-effect files, such as the timeline-effect file 500 (shown in FIG. 7) using predefined conversion parameters. First, basis haptic-effect signals can be developed for each type of MIDI instrument to be converted. A library storing all such signals can be developed and updated to contain all known MIDI instruments, if desired. According to one or more embodiments of the invention, these basis haptic-effect signals can be named with the same name as the corresponding MIDI instruments, which are provided in the MIDI specification (e.g., acoustic grand piano, bright acoustic piano, electric grand piano, honky-tonk piano, etc.).

Automatic conversion from a sound file (e.g., a MIDI file) to a timeline haptic effect file can be accomplished in a variety of ways. According to one or more embodiments of the invention, a sound file can be analyzed for suitability of automatic conversion. If it is determined that the file is not suitable for automatic conversion, then an alert can be generated, and the file can be rejected. If the sound file is suitable to be automatically converted, then the MIDI conversion computer window 1500 can be presented to a user, each of the identified instruments being displayed with the corresponding channel and a suggested frequency map.

The MIDI conversion computer window 1500 shown in FIG. 15 illustrates some options that can be selected to facilitate conversion from a MIDI file to a timeline haptic effect file. For example, the MIDI channel name and corresponding MIDI instruments can be identified. If automatically converting the MIDI file to a timeline haptic effect is desired, the "import" option can be selected. Options can also be selected for automatic conversion of MIDI durations to haptic effect durations, MIDI note velocity to haptic effect magnitude, MIDI note number to haptic effect frequency (which can be adjusted using the frequency map described below), and so forth. It should be recognized that additional conversions can be implemented depending upon the desired conversion to be performed by one or more embodiments of the invention.

MIDI files can be converted in several ways. For example, each instrument can be converted to haptic effects (e.g., in a haptic-effect file). Similarly, each channel of the MIDI file can be converted to haptic effects. Additionally, any instrument-channel combination defined in a MIDI file can be converted to haptic effects (e.g., using an automatic conversion technique). In many instances, conversion of all notes defined for a particular channel in a MIDI file can be selected for automatic conversion to haptic-effect signals. In some instances, conversion of notes for each instrument, or even each note within a channel, may be desirable. For example, on MIDI channel 10, each percussion instrument corresponds to an individual note within that channel. Thus, to accurately convert certain percussion instruments to haptic effects, individual notes within channel 10 should be mapped or otherwise converted to haptic effects (e.g., by creating appropriate haptic-effect signals).

The conversion from MIDI files to files defining haptic effects can use the various events of the MIDI file. For example, MIDI files generally have "note-on-events" and "note-off-events" indicating the beginning or end of a MIDI note, respectively. Both note-on-events and note-off-events specify a MIDI channel number, a note number, and a note velocity. MIDI files can also have other events, such as a "program-change event" that indicates changes in instrumentation for a giving MIDI channels. For example, a program-change event can specify that 30 seconds into a song, the instrument used on channel 1 is to be changed from a first instrument (e.g., acoustic guitar) to a second instrument (e.g., electric guitar).

Conversion of MIDI information to haptic-effect information can occur using several techniques. For example, a duration-override command can be used to match a note-on-event with its corresponding note-off-event (i.e., the note-off-event for the same note as the note-on-event) to determine note durations. A haptic effect can then be commanded (e.g., using a basis haptic-effect signal or a timeline haptic-effect signal) to have the determined note duration, or the duration can be changed by manually overriding the automatic duration to set a desired duration. Additionally, a velocity-to-magnitude command can be used to set the magnitude of an effect to be commanded (e.g., using a basis haptic-effect signal or a timeline haptic-effect signal) based on the velocity of a MIDI note (e.g., as specified in the note-on-event that generated the note with which the haptic effect is to be associated or synchronized). Furthermore, a note-to-speed command can set the frequency of a commanded haptic effect based on a MIDI note number (e.g., the note number for a MIDI note specified in the note-on-event for the note with which the haptic effect is to be associated or synchronized).

Additionally, components of the timeline haptic effect can be created using default parameters, or using custom parameters specified in a conversion reference file, which can be selected using the MIDI conversion computer window 1500. The frequency map of the one or more channels can be edited by selecting one or more "edit freq. map" buttons shown on the right-hand side of the MIDI conversion computer window 1500. Each of the options listed above can be selected on a channel-by-channel basis, an instrument-by-instrument basis, or a combination thereof.

Table 2 below shows some options for automatically converting various MIDI messages to timeline events (e.g., events of the timeline-effect definition 1000 of FIG. 10).

TABLE 2

Some options for automatic conversion from MIDI to timeline events

| MIDI messages | Timeline events |
| --- | --- |
| Note On | LaunchPlayback |
| Note Off | Duration between a "Note On" and a "Note Off" determines the value of duration override in LaunchPlayback event |
| Program Change | Effect ID override in LaunchPlayback event |
| Bank Select | Effect ID override in LaunchPlayback event Effect ID is a combination of "Bank Select" and "Program Change" |
| All Sound Off | "All Sound Off" is treated as a "Note Off" for all pending "Note On" |
| All Notes Off | "All Notes Off" is treated as a "Note Off" for all pending "Note On" |
| Set Tempo | "Set Tempo" MIDI event determines TimeOffset property of a given LaunchPlayback event |

Figure 16:
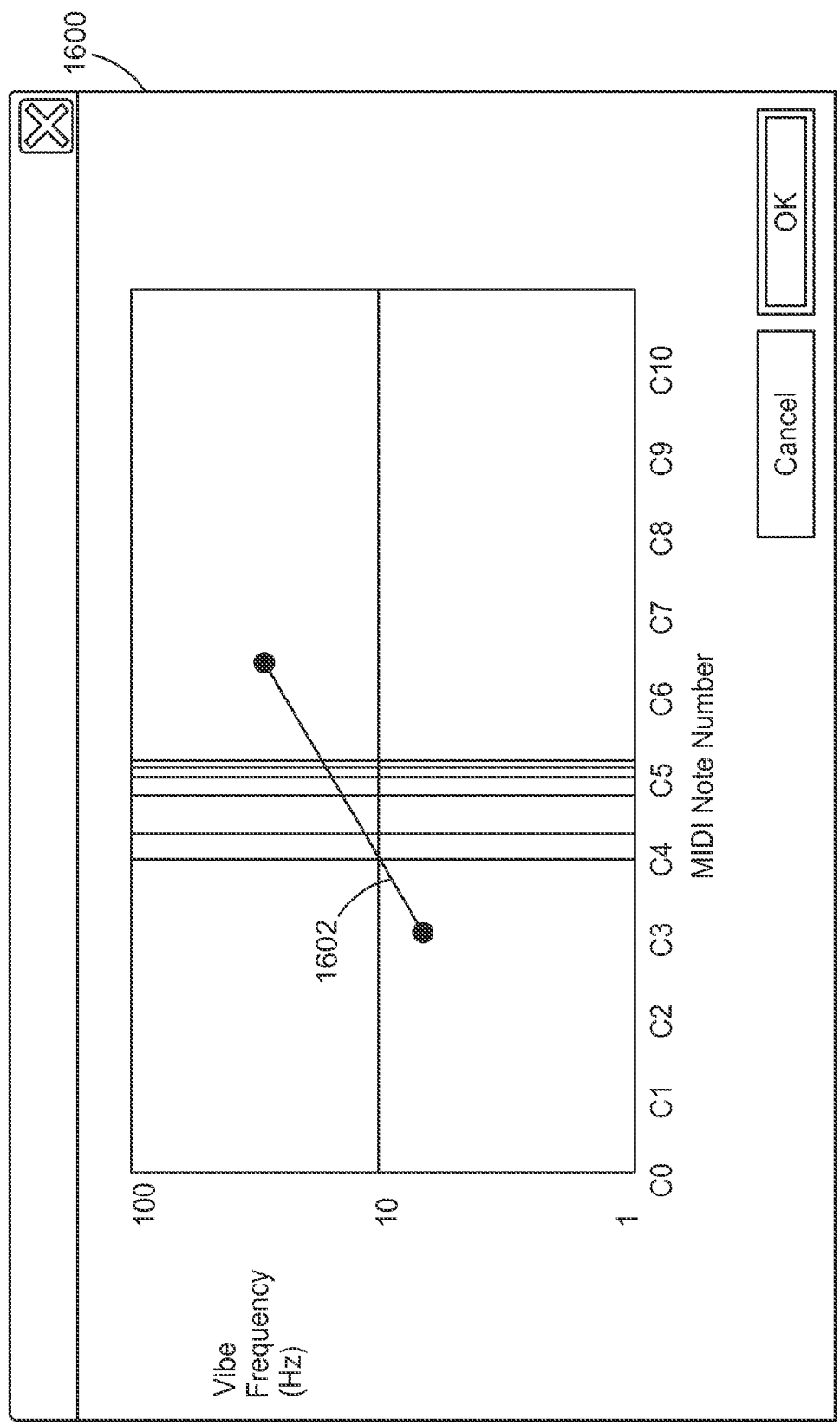
FIG. 16 is a diagram of a computer window of an application for editing a frequency mapping of a haptic effect from a sound file, according to an embodiment of the invention.

FIG. 16 is a diagram of a computer window of an application for editing a frequency mapping of a haptic effect from a sound file, according to an embodiment of the invention. According to one or more embodiments of the invention, selecting one or more "edit freq. map" buttons shown on the right-hand side of the MIDI conversion computer window 1500 (shown in FIG. 15) will access the frequency map computer window 1600 shown in FIG. 16. The frequency map shown in the frequency map computer window 1600 plots all existing MIDI channels in a MIDI file to be converted to a timeline effect frequency. Each of the channels (shown on the horizontal axis) can be mapped to a vibration frequency of a periodic haptic effect (shown on the vertical axis) using a translation curve 1602, with which a user can interact with using the GUI within which the window 1600 is presented (e.g., using "click-and-drag" techniques, etc.). The translation curve 1602 defines the frequencies of a haptic device that correspond to the MIDI channels of the MIDI file being analyzed. This translation curve 1602 can be adjusted to change which effect frequencies will be output for sounds in a given MIDI channel. Of course, other mappings (e.g., as defined using differently shaped translation curves, etc.) can be used for other types of haptic effects according to one or more embodiments of the invention.

From the foregoing, it can be seen that systems and methods for ordering haptic effects are discussed. Specific embodiments have been described above in connection with a system that is configured to order multiple, basis haptic effects to create timeline haptic effects. A file format is provided for defining a timeline haptic effect. Additionally, various aspects of an operating system are provided for creating, editing, modifying, and/or ordering haptic effects to create a timeline haptic effect.

It will be appreciated, however, that embodiments of the invention can be in other specific forms without departing from the spirit or essential characteristics thereof. For example, while some embodiments have been described in the context of timeline haptic effects created using multiple ordered basis haptic effects, one can also use timeline haptic effects, as well as other types of effects, as components to create other timeline effects according to the principles described above. Additionally, the GUI computer windows and file formats described herein are intended as examples only, and can be varied in numerous ways to provide the same or substantially similar functionality, all of which is considered within the scope of the invention.

What is claimed is:

1. A non-transitory computer-readable medium having instructions stored thereon that, when executed by a processor, cause the processor to order a plurality of haptic effects, the ordering comprising:
    receiving a signal associated with the plurality of haptic effects, each haptic effect from the plurality of haptic effects being associated with a time slot from a plurality of time slots;
    associating each haptic effect from the plurality of haptic effects with an effect slot from a plurality of effect slots at least partially based on the time slot associated with that haptic effect;
    generating a haptic effect file based on a multimedia file and storing the haptic effect file separately from the multimedia file, wherein a resulting haptic effect is synchronized with the multimedia file; and
    sending an output signal for each effect slot from the plurality of effect slots, when the associated haptic effect is scheduled for its time slot.

2. The non-transitory computer-readable medium of claim 1, the ordering further comprising synchronously outputting a haptic effect with the multimedia file.

3. The non-transitory computer-readable medium of claim 1, wherein each time slot from the plurality of time slots defines a time during which each associated haptic effect is output.

4. The non-transitory computer-readable medium of claim 1, the ordering further comprising defining a timeline for the plurality of time slots, the plurality of haptic effects being output at least partially based on the defined timeline.

5. The non-transitory computer-readable medium of claim 1, the ordering further comprising outputting the plurality of haptic effects.

6. The non-transitory computer-readable medium of claim 1, wherein the multimedia file comprises one of: a music instrument digital interface (MIDI) file; a waveform audio file format (WAV) file; or a MPEG-1 or MPEG-2 audio layer III (MP3) file.

7. A computer-implemented method for ordering a plurality of haptic effects, the method comprising:
    receiving a signal associated with the plurality of haptic effects, each haptic effect from the plurality of haptic effects being associated with a time slot from a plurality of time slots;
    associating each haptic effect from the plurality of haptic effects with an effect slot from a plurality of effect slots at least partially based on the time slot associated with that haptic effect;
    generating a haptic effect file based on a multimedia file and storing the haptic effect file separately from the multimedia file, wherein a resulting haptic effect is synchronized with the multimedia file; and
    sending an output signal for each effect slot from the plurality of effect slots, when the associated haptic effect is scheduled for its time slot.

8. The method of claim 7, further comprising synchronously outputting a haptic effect with the multimedia file.

9. The method of claim 7, wherein each time slot from the plurality of time slots defines a time during which each associated haptic effect is output.

10. The method of claim 7, further comprising defining a timeline for the plurality of time slots, the plurality of haptic effects being output at least partially based on the defined timeline.

11. The method of claim 7, further comprising outputting the plurality of haptic effects.

12. The method of claim 7, wherein the multimedia file comprises one of: a music instrument digital interface (MIDI) file; a waveform audio file format (WAV) file; or a MPEG-1 or MPEG-2 audio layer III (MP3) file.

13. An apparatus that outputs haptic effects, the apparatus comprising:
   an interface component configured to receive a signal associated with the plurality of haptic effects, each haptic effect from the plurality of haptic effects being associated with a time slot from a plurality of time slots;
   an ordering component configured to associate each haptic effect from the plurality of haptic effects with an effect slot from a plurality of effect slots at least partially based on the time slot associated with that haptic effect;
   wherein the order component is further configured to generate a haptic effect file based on a multimedia file and store the haptic effect file separately from the multimedia file, wherein a resulting haptic effect is synchronized with the multimedia file; and
   an output component configured to send an output signal for each effect slot from the plurality of effect slots, when the associated haptic effect is scheduled for its time slot.

14. The apparatus of claim 13, wherein the output component is further configured to synchronously output a haptic effect with the multimedia file.

15. The apparatus of claim 13, wherein each time slot from the plurality of time slots defines a time during which each associated haptic effect is output.

16. The apparatus of claim 13, wherein the ordering component is further configured to define a timeline for the plurality of time slots, the plurality of haptic effects being output at least partially based on the defined timeline.

17. The apparatus of claim 13, wherein the output component is further configured to output the plurality of haptic effects.

18. The apparatus of claim 13, wherein the multimedia file comprises one of: a music instrument digital interface (MIDI) file; a waveform audio file format (WAV) file; or a MPEG-1 or MPEG-2 audio layer III (MP3) file.

19. A non-transitory computer-readable medium having instructions stored thereon that, when executed by a processor, causes the processor to order a plurality of haptic effects, the ordering comprising:
   receiving a signal associated with the plurality of haptic effects, each haptic effect from the plurality of haptic effects being associated with a time slot from a plurality of time slots;
   associating each haptic effect from the plurality of haptic effects with an effect slot from a plurality of effect slots at least partially based on the time slot associated with that haptic effect;
   generating a haptic effect file based on a multimedia file and storing the haptic effect file separately from the multimedia file, wherein a resulting haptic effect is synchronized with the multimedia file; and
   creating a timeline haptic-effect signal to synchronize the haptic effect to an effect slot.

20. The non-transitory computer-readable medium of claim 19, wherein the multimedia file comprises one of: a music instrument digital interface (MIDI) file; a waveform audio file format (WAV) file; or a MPEG-1 or MPEG-2 audio layer III (MP3) file.

\* \* \* \* \*